(12) United States Patent
Zhang et al.

(10) Patent No.: US 12,323,617 B2
(45) Date of Patent: Jun. 3, 2025

(54) ROUNDING IN PAIRWISE AVERAGE CANDIDATE CALCULATIONS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/484,912

(22) Filed: Oct. 11, 2023

(65) Prior Publication Data
US 2024/0040144 A1    Feb. 1, 2024

Related U.S. Application Data

(63) Continuation of application No. 17/525,745, filed on Nov. 12, 2021, now Pat. No. 11,792,421, which is a
(Continued)

(30) Foreign Application Priority Data

Nov. 10, 2018    (WO) ................ PCT/CN2018/114931

(51) Int. Cl.
*H04N 19/52*    (2014.01)
*H04N 19/176*    (2014.01)

(52) U.S. Cl.
CPC ........... *H04N 19/52* (2014.11); *H04N 19/176* (2014.11)

(58) Field of Classification Search
None
See application file for complete search history.

(56) References Cited

U.S. PATENT DOCUMENTS

| 1,147,763 A | 7/1915 | Terry |
| 7,529,302 B2 | 5/2009 | Mukerjee |
| (Continued) | | |

FOREIGN PATENT DOCUMENTS

| CA | 3025490 A1 | 12/2017 |
| CA | 3037685 A1 | 3/2018 |
| (Continued) | | |

OTHER PUBLICATIONS

US 11,297,334 B2, 04/2022, Zhang et al. (withdrawn)
(Continued)

*Primary Examiner* — Mohammad J Rahman
(74) *Attorney, Agent, or Firm* — Conley Rose, P.C.

(57) ABSTRACT

Devices, systems, and methods for unified rounding in sub-block based prediction are described. In a representative aspect, a method of video processing includes generating, for a processing of a current block of video, a pairwise merge candidate based on a pair of motion candidates, and performing, based on the pairwise merge candidate, a conversion between the current block and a bitstream representation of the video. In another representative aspect, a method of video processing includes generating, for a current block of video coded using a geometry partition mode, a uni-prediction motion candidate based on a scaled motion vector and a List0 motion vector, and performing, based on the uni-prediction motion candidate, a conversion between the current block and a bitstream representation of the video.

20 Claims, 23 Drawing Sheets

Related U.S. Application Data continuation of application No. 17/161,391, filed on Jan. 28, 2021, now abandoned, which is a continuation of application No. PCT/CN2019/117119, filed on Nov. 11, 2019.

(56) References Cited

U.S. PATENT DOCUMENTS

| | | | |
|---|---|---|---|
| 8,184,715 B1 | 5/2012 | Rosenzweig | |
| 8,462,846 B2 | 6/2013 | Zhang | |
| 9,106,922 B2* | 8/2015 | Fludkov | H04N 19/52 |
| 9,294,777 B2 | 3/2016 | Wang | |
| 9,374,595 B2 | 6/2016 | Kim | |
| 9,432,684 B2 | 8/2016 | Lee | |
| 9,521,425 B2 | 12/2016 | Chen | |
| 9,615,089 B2 | 4/2017 | Fartukov | |
| 9,667,996 B2 | 5/2017 | Chen | |
| 9,674,542 B2 | 6/2017 | Chen | |
| 9,762,927 B2 | 9/2017 | Chen | |
| 9,900,593 B2 | 2/2018 | Xiu | |
| 9,948,930 B2 | 4/2018 | Panusopone | |
| 9,955,186 B2 | 4/2018 | Chon | |
| 10,045,014 B2 | 8/2018 | Zhang | |
| 10,142,655 B2 | 11/2018 | Lin | |
| 10,298,950 B2 | 5/2019 | Wang | |
| 10,362,330 B1 | 7/2019 | Li | |
| 10,404,990 B2 | 9/2019 | Hendry | |
| 10,419,763 B2 | 9/2019 | Huang | |
| 10,440,378 B1 | 10/2019 | Xu | |
| 10,448,010 B2 | 10/2019 | Chen | |
| 10,484,686 B2 | 11/2019 | Xiu | |
| 10,491,902 B1 | 11/2019 | Xu | |
| 10,523,964 B2 | 12/2019 | Chuang | |
| 10,560,712 B2 | 2/2020 | Zou | |
| 10,701,366 B2 | 6/2020 | Chen | |
| 10,708,592 B2 | 7/2020 | Dong | |
| 10,757,417 B2 | 8/2020 | Zhang | |
| 10,778,999 B2 | 9/2020 | Li | |
| 10,779,002 B2 | 9/2020 | Chen | |
| 10,785,494 B2 | 9/2020 | Chien | |
| 10,805,630 B2 | 10/2020 | Li | |
| 10,841,609 B1 | 11/2020 | Liu | |
| 10,904,565 B2 | 1/2021 | Chuang | |
| 10,911,772 B2 | 2/2021 | Sato | |
| 11,066,131 B2 | 7/2021 | Lee et al. | |
| 11,172,196 B2 | 11/2021 | Zhang | |
| 11,197,003 B2 | 12/2021 | Zhang | |
| 11,197,007 B2 | 12/2021 | Zhang | |
| 11,202,065 B2 | 12/2021 | Zhang | |
| 11,202,081 B2 | 12/2021 | Zhang | |
| 11,252,406 B2* | 2/2022 | Lai | H04N 19/159 |
| 11,477,463 B2 | 10/2022 | Zhang | |
| 11,509,915 B2 | 11/2022 | Zhang | |
| 11,523,123 B2 | 12/2022 | Zhang | |
| 11,616,945 B2 | 3/2023 | Zhang | |
| 11,659,192 B2 | 5/2023 | Zhang et al. | |
| 11,765,343 B2* | 9/2023 | Chen | H04N 19/105 375/240.16 |
| 11,792,421 B2 | 10/2023 | Zhang et al. | |
| 11,831,884 B2 | 11/2023 | Zhang et al. | |
| 11,895,306 B2 | 2/2024 | Zhang et al. | |
| 12,132,889 B2 | 10/2024 | Zhang et al. | |
| 12,132,891 B2* | 10/2024 | Chen | H04N 19/176 |
| 2007/0192762 A1 | 8/2007 | Eichenberger | |
| 2010/0036230 A1 | 2/2010 | Greene et al. | |
| 2011/0002386 A1 | 1/2011 | Zhang | |
| 2011/0194609 A1 | 8/2011 | Rusert | |
| 2011/0200107 A1 | 8/2011 | Ryu | |
| 2012/0219216 A1 | 8/2012 | Sato | |
| 2012/0287999 A1 | 11/2012 | Li | |
| 2012/0320984 A1 | 12/2012 | Zhou | |
| 2013/0003842 A1 | 1/2013 | Kondo | |
| 2013/0101041 A1 | 4/2013 | Fishwick | |
| 2013/0107958 A1 | 5/2013 | Shimada | |
| 2013/0128970 A1 | 5/2013 | Yu | |
| 2013/0128976 A1 | 5/2013 | Koyama | |
| 2013/0182755 A1 | 7/2013 | Chen | |
| 2013/0229485 A1 | 9/2013 | Rusanovskyy | |
| 2013/0272410 A1 | 10/2013 | Seregin | |
| 2013/0329007 A1 | 12/2013 | Zhang | |
| 2013/0329784 A1 | 12/2013 | Chuang | |
| 2014/0086325 A1 | 3/2014 | Chen | |
| 2014/0169472 A1* | 6/2014 | Fludkov | H04N 19/42 375/240.16 |
| 2014/0286408 A1 | 9/2014 | Zhang | |
| 2014/0286416 A1 | 9/2014 | Jeon | |
| 2014/0294066 A1 | 10/2014 | Kondo | |
| 2014/0294078 A1 | 10/2014 | Seregin | |
| 2014/0334551 A1 | 11/2014 | Kim | |
| 2015/0023423 A1 | 1/2015 | Zhang | |
| 2015/0110178 A1 | 4/2015 | Kim | |
| 2015/0181216 A1 | 6/2015 | Zhang | |
| 2015/0249828 A1 | 9/2015 | Rosewarne | |
| 2015/0312588 A1 | 10/2015 | Yamamoto | |
| 2015/0373350 A1 | 12/2015 | Hendry | |
| 2015/0373357 A1 | 12/2015 | Pang | |
| 2015/0373358 A1 | 12/2015 | Pang et al. | |
| 2015/0373362 A1 | 12/2015 | Pang | |
| 2016/0029046 A1 | 1/2016 | Li | |
| 2016/0057420 A1 | 2/2016 | Pang | |
| 2016/0073132 A1 | 3/2016 | Zhang | |
| 2016/0100189 A1 | 4/2016 | Pang | |
| 2016/0142729 A1 | 5/2016 | Wang | |
| 2016/0286229 A1 | 9/2016 | Li | |
| 2016/0337662 A1 | 11/2016 | Pang et al. | |
| 2016/0366441 A1 | 12/2016 | An | |
| 2016/0373756 A1 | 12/2016 | Yu | |
| 2017/0013279 A1 | 1/2017 | Puri et al. | |
| 2017/0054996 A1 | 2/2017 | Xu | |
| 2017/0085905 A1 | 3/2017 | Kadono | |
| 2017/0094305 A1 | 3/2017 | Li | |
| 2017/0142418 A1 | 5/2017 | Li | |
| 2017/0223378 A1 | 8/2017 | Tao | |
| 2017/0238005 A1 | 8/2017 | Chien | |
| 2017/0238011 A1 | 8/2017 | Pettersson | |
| 2017/0272748 A1 | 9/2017 | Seregin | |
| 2017/0272782 A1 | 9/2017 | Li | |
| 2017/0280159 A1 | 9/2017 | Xu | |
| 2017/0289566 A1 | 10/2017 | He | |
| 2017/0302929 A1 | 10/2017 | Chen | |
| 2017/0310990 A1 | 10/2017 | Hsu | |
| 2017/0332000 A1 | 11/2017 | Wang et al. | |
| 2017/0332095 A1 | 11/2017 | Zou | |
| 2017/0332099 A1 | 11/2017 | Lee | |
| 2017/0339404 A1 | 11/2017 | Panusopone | |
| 2017/0339405 A1 | 11/2017 | Wang | |
| 2018/0041762 A1 | 2/2018 | Ikai | |
| 2018/0048889 A1 | 2/2018 | Zhang | |
| 2018/0054628 A1 | 2/2018 | Pettersson | |
| 2018/0063553 A1 | 3/2018 | Zhang | |
| 2018/0098062 A1 | 4/2018 | Li | |
| 2018/0098063 A1 | 4/2018 | Chen | |
| 2018/0098087 A1 | 4/2018 | Li | |
| 2018/0109814 A1 | 4/2018 | Chuang et al. | |
| 2018/0124394 A1 | 5/2018 | Xu | |
| 2018/0131952 A1 | 5/2018 | Xiu | |
| 2018/0184117 A1 | 6/2018 | Chen | |
| 2018/0192069 A1 | 7/2018 | Chen | |
| 2018/0192072 A1 | 7/2018 | Chen | |
| 2018/0199056 A1 | 7/2018 | Sato | |
| 2018/0199057 A1 | 7/2018 | Chuang | |
| 2018/0220149 A1 | 8/2018 | Son | |
| 2018/0247396 A1 | 8/2018 | Pouli | |
| 2018/0249172 A1 | 8/2018 | Chen | |
| 2018/0262773 A1 | 9/2018 | Chuang et al. | |
| 2018/0270500 A1 | 9/2018 | Li | |
| 2018/0278949 A1 | 9/2018 | Karczewicz et al. | |
| 2018/0278951 A1 | 9/2018 | Seregin | |
| 2018/0288425 A1 | 10/2018 | Panusopone | |
| 2018/0288441 A1 | 10/2018 | Zhang | |
| 2018/0310017 A1 | 10/2018 | Chen | |
| 2018/0324454 A1 | 11/2018 | Lin | |
| 2018/0332298 A1 | 11/2018 | Liu | |
| 2018/0376166 A1 | 12/2018 | Chuang | |

(56) References Cited

U.S. PATENT DOCUMENTS

| | | |
|---|---|---|
| 2019/0020878 A1 | 1/2019 | Xu |
| 2019/0020895 A1 | 1/2019 | Liu |
| 2019/0037231 A1 | 1/2019 | Ikai |
| 2019/0052886 A1 | 2/2019 | Chiang |
| 2019/0058897 A1 | 2/2019 | Han |
| 2019/0068977 A1 | 2/2019 | Zhang |
| 2019/0075293 A1 | 3/2019 | Lim |
| 2019/0104303 A1 | 4/2019 | Xiu |
| 2019/0124332 A1 | 4/2019 | Lim |
| 2019/0158866 A1 | 5/2019 | Kim |
| 2019/0182504 A1 | 6/2019 | Lainema |
| 2019/0191171 A1 | 6/2019 | Ikai |
| 2019/0222859 A1 | 7/2019 | Chuang |
| 2019/0246128 A1 | 8/2019 | Xu |
| 2019/0246143 A1 | 8/2019 | Zhang |
| 2019/0268594 A1 | 8/2019 | Lim et al. |
| 2019/0273943 A1 | 9/2019 | Zhao |
| 2019/0281294 A1 | 9/2019 | Kim |
| 2019/0306502 A1 | 10/2019 | Gadde |
| 2019/0320181 A1 | 10/2019 | Chen |
| 2019/0320189 A1 | 10/2019 | Cooper |
| 2019/0335170 A1 | 10/2019 | Lee |
| 2019/0342547 A1 | 11/2019 | Lee |
| 2019/0364295 A1 | 11/2019 | Li |
| 2019/0373259 A1 | 12/2019 | Xu |
| 2019/0373261 A1 | 12/2019 | Egilmez |
| 2019/0387250 A1 | 12/2019 | Boyce |
| 2020/0021837 A1 | 1/2020 | Ikai |
| 2020/0021839 A1 | 1/2020 | Pham Van |
| 2020/0045307 A1 | 2/2020 | Jang |
| 2020/0045310 A1 | 2/2020 | Chen |
| 2020/0045311 A1 | 2/2020 | Yoo |
| 2020/0053364 A1 | 2/2020 | Seo |
| 2020/0059658 A1 | 2/2020 | Chien |
| 2020/0084441 A1 | 3/2020 | Lee |
| 2020/0084454 A1 | 3/2020 | Liu |
| 2020/0099941 A1 | 3/2020 | Li |
| 2020/0099951 A1 | 3/2020 | Hung |
| 2020/0112741 A1 | 4/2020 | Han |
| 2020/0120334 A1 | 4/2020 | Xu |
| 2020/0128154 A1 | 4/2020 | Wang et al. |
| 2020/0128237 A1 | 4/2020 | Xu |
| 2020/0128258 A1 | 4/2020 | Chen |
| 2020/0137398 A1 | 4/2020 | Zhao |
| 2020/0145688 A1 | 5/2020 | Zou |
| 2020/0154127 A1 | 5/2020 | Lee |
| 2020/0169726 A1 | 5/2020 | Kim |
| 2020/0177911 A1 | 6/2020 | Aono |
| 2020/0186818 A1 | 6/2020 | Li |
| 2020/0213594 A1 | 7/2020 | Liu |
| 2020/0213612 A1 | 7/2020 | Liu |
| 2020/0213622 A1 | 7/2020 | Xu |
| 2020/0221077 A1 | 7/2020 | Park |
| 2020/0221110 A1 | 7/2020 | Chien |
| 2020/0221120 A1 | 7/2020 | Robert |
| 2020/0267408 A1 | 8/2020 | Lee |
| 2020/0275120 A1 | 8/2020 | Lin |
| 2020/0280735 A1 | 9/2020 | Lim |
| 2020/0296380 A1 | 9/2020 | Aono |
| 2020/0296382 A1 | 9/2020 | Zhao |
| 2020/0296415 A1 | 9/2020 | Chen |
| 2020/0336738 A1 | 10/2020 | Xiu |
| 2020/0351505 A1 | 11/2020 | Seo |
| 2020/0359029 A1 | 11/2020 | Liu |
| 2020/0374543 A1 | 11/2020 | Liu |
| 2020/0374544 A1 | 11/2020 | Liu |
| 2020/0382771 A1 | 12/2020 | Liu |
| 2020/0382795 A1 | 12/2020 | Zhang |
| 2020/0382807 A1 | 12/2020 | Liu |
| 2020/0396453 A1 | 12/2020 | Zhang |
| 2020/0396462 A1 | 12/2020 | Zhang |
| 2020/0396465 A1 | 12/2020 | Zhang |
| 2020/0404255 A1 | 12/2020 | Zhang |
| 2020/0404260 A1 | 12/2020 | Zhang |
| 2020/0413048 A1 | 12/2020 | Zhang |
| 2021/0006780 A1 | 1/2021 | Zhang |
| 2021/0006787 A1 | 1/2021 | Zhang |
| 2021/0029356 A1 | 1/2021 | Zhang |
| 2021/0029362 A1 | 1/2021 | Liu |
| 2021/0029368 A1 | 1/2021 | Zhang |
| 2021/0037240 A1 | 2/2021 | Zhang |
| 2021/0037256 A1 | 2/2021 | Zhang |
| 2021/0051339 A1 | 2/2021 | Liu |
| 2021/0067783 A1 | 3/2021 | Liu |
| 2021/0076050 A1 | 3/2021 | Zhang |
| 2021/0076063 A1 | 3/2021 | Liu |
| 2021/0092379 A1 | 3/2021 | Zhang |
| 2021/0092435 A1 | 3/2021 | Liu |
| 2021/0105482 A1 | 4/2021 | Zhang |
| 2021/0152846 A1 | 5/2021 | Zhang |
| 2021/0176485 A1 | 6/2021 | Chuang |
| 2021/0203958 A1 | 7/2021 | Zhang |
| 2021/0218980 A1 | 7/2021 | Zhang |
| 2021/0227234 A1 | 7/2021 | Zhang |
| 2021/0258569 A1* | 8/2021 | Chen .................... H04N 19/52 |
| 2021/0314560 A1* | 10/2021 | Lai ...................... H04N 19/176 |
| 2021/0321125 A1* | 10/2021 | Kim .................... H04N 19/513 |
| 2021/0352302 A1 | 11/2021 | Zhang et al. |
| 2021/0392341 A1 | 12/2021 | Zhang et al. |
| 2022/0007046 A1* | 1/2022 | Chen .................... H04N 19/182 |
| 2022/0070439 A1* | 3/2022 | Laroche .............. H04N 19/109 |
| 2022/0070488 A1 | 3/2022 | Chen |
| 2022/0070489 A1 | 3/2022 | Zhang |
| 2022/0078452 A1 | 3/2022 | Zhang |
| 2022/0124319 A1* | 4/2022 | Lai ........................ H04N 19/52 |
| 2022/0217363 A1 | 7/2022 | Zhang |
| 2022/0248026 A1* | 8/2022 | Lee .................... H04N 19/119 |
| 2022/0264125 A1 | 8/2022 | Zhang |
| 2024/0015333 A1* | 1/2024 | Chen .................... H04N 19/70 |
| 2024/0048686 A1* | 2/2024 | Chen .................... H04N 19/196 |

FOREIGN PATENT DOCUMENTS

| | | |
|---|---|---|
| CN | 1672174 A | 9/2005 |
| CN | 1710959 A | 12/2005 |
| CN | 1777283 A | 5/2006 |
| CN | 101605255 A | 12/2009 |
| CN | 101895751 A | 11/2010 |
| CN | 102577388 A | 7/2012 |
| CN | 102685479 A | 9/2012 |
| CN | 202942842 U | 5/2013 |
| CN | 103535010 A | 1/2014 |
| CN | 103535040 A | 1/2014 |
| CN | 103561263 A | 2/2014 |
| CN | 104053005 A | 9/2014 |
| CN | 104170381 A | 11/2014 |
| CN | 104221376 A | 12/2014 |
| CN | 104396242 A | 3/2015 |
| CN | 104904207 A | 9/2015 |
| CN | 204973721 U | 1/2016 |
| CN | 105306944 A | 2/2016 |
| CN | 105532000 A | 4/2016 |
| CN | 105678808 A | 6/2016 |
| CN | 105723713 A | 6/2016 |
| CN | 105917650 A | 8/2016 |
| CN | 205627809 U | 10/2016 |
| CN | 106105191 A | 11/2016 |
| CN | 106303543 A | 1/2017 |
| CN | 106416245 A | 2/2017 |
| CN | 106537915 A | 3/2017 |
| CN | 106559669 A | 4/2017 |
| CN | 106688232 A | 5/2017 |
| CN | 206304662 U | 7/2017 |
| CN | 107079161 A | 8/2017 |
| CN | 107113424 A | 8/2017 |
| CN | 107113442 A | 8/2017 |
| CN | 107211156 A | 9/2017 |
| CN | 107409225 A | 11/2017 |
| CN | 107426568 A | 12/2017 |
| CN | 107534778 A | 1/2018 |
| CN | 107615765 A | 1/2018 |
| CN | 107646195 A | 1/2018 |
| CN | 107852490 A | 3/2018 |
| CN | 107925770 A | 4/2018 |

(56) References Cited

FOREIGN PATENT DOCUMENTS

| | | |
|---|---|---|
| CN | 107925775 A | 4/2018 |
| CN | 107979756 A | 5/2018 |
| CN | 108012153 A | 5/2018 |
| CN | 108028929 A | 5/2018 |
| CN | 108353184 A | 7/2018 |
| CN | 108432250 A | 8/2018 |
| CN | 207872031 U | 9/2018 |
| CN | 108632629 A | 10/2018 |
| CN | 112020829 A | 12/2020 |
| EP | 3522537 A1 | 8/2019 |
| EP | 3788782 A1 | 3/2021 |
| GB | 2539213 A | 12/2016 |
| JP | H08186825 A | 7/1996 |
| JP | 2004344828 A | 12/2004 |
| JP | 2007272733 A | 10/2007 |
| JP | 2011077761 A | 4/2011 |
| JP | 2013098745 A | 5/2013 |
| JP | 2021513818 A | 5/2021 |
| KR | 20180028514 A | 3/2018 |
| KR | 20200128154 A | 11/2020 |
| KR | 102701593 B1 | 8/2024 |
| KR | 102738271 B1 | 11/2024 |
| TW | 201540047 A | 10/2015 |
| TW | 201709738 A | 3/2017 |
| TW | 201832557 A | 9/2018 |
| WO | 0065829 A1 | 11/2000 |
| WO | 2000065829 A1 | 11/2000 |
| WO | 2009080133 A1 | 7/2009 |
| WO | 2011077761 A1 | 6/2011 |
| WO | 2012045225 A1 | 4/2012 |
| WO | 2013070028 A1 | 5/2013 |
| WO | 2013168407 A1 | 11/2013 |
| WO | 2015196029 A1 | 12/2015 |
| WO | 2016048834 A1 | 3/2016 |
| WO | 2016057701 A1 | 4/2016 |
| WO | 2016057938 A1 | 4/2016 |
| WO | 2016091161 A1 | 6/2016 |
| WO | 2016138513 A1 | 9/2016 |
| WO | 2016183224 A1 | 11/2016 |
| WO | 2017036399 A1 | 3/2017 |
| WO | 2017058899 A1 | 4/2017 |
| WO | 2017118411 A1 | 7/2017 |
| WO | 2017130696 A1 | 8/2017 |
| WO | 2017133661 A1 | 8/2017 |
| WO | 2017156669 A1 | 9/2017 |
| WO | 2017157264 A1 | 9/2017 |
| WO | 2017157281 A1 | 9/2017 |
| WO | 2017165391 A1 | 9/2017 |
| WO | 2017188509 A1 | 11/2017 |
| WO | 2017194756 A1 | 11/2017 |
| WO | 2017195554 A1 | 11/2017 |
| WO | 2017197126 A1 | 11/2017 |
| WO | 2017197146 A1 | 11/2017 |
| WO | 2017205701 A1 | 11/2017 |
| WO | 2017206803 A1 | 12/2017 |
| WO | 2018018459 A1 | 2/2018 |
| WO | 2018047668 A1 | 3/2018 |
| WO | 2018065397 A2 | 4/2018 |
| WO | 2018066241 A1 | 4/2018 |
| WO | 2018067823 A1 | 4/2018 |
| WO | 2018097692 A2 | 5/2018 |
| WO | 2018097693 A2 | 5/2018 |
| WO | 2018097693 A3 | 7/2018 |
| WO | 2018184589 A1 | 10/2018 |
| WO | 2020086331 A1 | 4/2020 |

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

Bross et al. "Versatile Video Coding (Draft 4)," Joint Video Experts Team (JVET) of ITU-T SG 16 WP 3 and ISO/IEC UTC 1/SC 29/WG 11, 13th Meeting, Marrakech, MA, Jan. 9-18, 2019, document JVET-M1001, 2019.

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, documentJVET-N1001, 2019.

Li et al. "Affine Deformation Model Based Intra Block Copy for Intra Frame Coding," 2020, Institute of Information and Communication Engineering, Zhejiang University.

Liao et al. "CE10.1.b: Triangular Prediction Unit Mode," Joint Video Exploration Team (JVET) of ITU-T SG 16 WP 3 nd ISO/IEC JTC 1/SC 29/WG 11, 12th Meeting, Macao, CN, Oct. 3-12, 2018, document JVET-L0124. 2018.

Van Der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11, 10th Meeting, San Diego, USA, Apr. 10-20, 2018. document JVET-J1023, 2018.

Zhou et al. "Spatial-Temporal Merge Mode (Non Subblock STMVP)," Joint Video Exploration Team (JVET) of ITU-T SG 16 WP 3 and 1SO/IEC JTC 1/SC 29/WG 11, 11th Meeting: Ljubljana, SI, Jul. 10-18, 2018, JVET-K0161, 2018.

Solovyev et al. "Non-CE4: Merge Mode Modification," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0056, 2018.

Yang et al. "BoG Report on CE4 Related Contributions," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0546, 2018.

Final Office Action from U.S. Appl. No. 17/732,849 dated Jun. 16, 2023.

Intention to Grant from British Patent Application No. 2018867.8 mailed Nov. 11, 2022 (2 pages).

Examination Report from Indian Patent Application No. 202228045435 mailed Dec. 26, 2022.

Non Final Office Action from U.S. Appl. No. 17/529,607 dated Oct. 31, 2022.

Non Final Office Action from U.S. Appl. No. 17/412,771 dated Feb. 16, 2023.

Non Final Office Action from U.S. Appl. No. 17/732,849 dated Mar. 2, 2023.

Final Office Action from U.S. Appl. No. 17/529,607 dated Apr. 17, 2023.

International Search Report and Written Opinion from PCT/CN2019/117116 dated Jan. 2, 2020 (9 pages).

International Search Report and Written Opinion from PCT/CN2019/117118 dated Feb. 5, 2020 (9 pages).

International Search Report and Written Opinion from PCT/CN2019/117119 dated Jan. 23, 2020 (9 pages).

International Search Report and Written Opinion from PCT/I82019/055244 dated Nov. 18, 2019 (18 pages).

International Search Report and Written Opinion from PCT/I82019/055246 dated Nov. 7, 2019 (18 pages).

International Search Report and Written Opinion from PCT/I82019/055247 dated Nov. 7, 2019 (21 pages).

Non-Final Office Action from U.S. Appl. No. 17/071,357 dated Dec. 8, 2020.

Non-Final Office Action from U.S. Appl. No. 17/099,042 dated Dec. 31, 2020.

Notice of Allowance from U.S. Appl. No. 17/071,412 dated Jan. 7, 2021.

Advisory Action from U.S. Appl. No. 17/074,892 dated Aug. 4, 2021.

Non-Final Office Action from U.S. Appl. No. 17/071,357 dated Sep. 21, 2021.

International Search Report and Written Opinion from PCT/I82019/054652 dated Sep. 27, 2019 (18 pages).

International Search Report and Written Opinion from PCT/I82019/054654 dated Aug. 27, 2019 (85 pages).

International Search Report and Written Opinion from PCT/I82019/058078 dated Mar. 3, 2020 (20 pages).

(56) References Cited

OTHER PUBLICATIONS

International Search Report and Written Opinion from PCT/I82019/058079 dated Mar. 3, 2020 (26 pages).
International Search Report and Written Opinion from PCT/I82019/058081 dated Mar. 25, 2020 (21 pages).
Non-Final Office Action from U.S. Appl. No. 17/019,629 dated Nov. 13, 2020.
Non-Final Office Action from U.S. Appl. No. 17/011,157 dated Nov. 17, 2020.
Non-Final Office Action from U.S. Appl. No. 17/031,451 dated Dec. 4, 2020.
Notice of Allowance from U.S. Appl. No. 17/011,131 dated Dec. 10, 2020.
Non-Final Office Action from U.S. Appl. No. 17/074,842 dated Dec. 23, 2020.
Non-Final Office Action from U.S. Appl. No. 17/074,892 dated Dec. 24, 2020.
Non-Final Office Action from U.S. Appl. No. 17/005,521 dated Jan. 7, 2021.
Final Office Action from U.S. Appl. No. 17/019,629 dated Feb. 26, 2021.
Final Office Action from U.S. Appl. No. 17/005,521 dated Apr. 26, 2021.
Non-Final Office Action from U.S. Appl. No. 17/161,391 dated Mar. 25, 2021.
Final Office Action from U.S. Appl. No. 17/161,391 dated Jul. 14, 2021.
Non Final Office Action from U.S. Appl. No. 17/210,797 dated Aug. 2, 2022.
International Search Report and Written Opinion from PCT/IB2019/054602 dated Aug. 21, 2019 (17 pages).
International Search Report and Written Opinion from PCT/IB2019/054604 dated Sep. 26, 2019 (17 pages).
International Search Report and Written Opinion from PCT/IB2019/054611 dated Aug. 29, 2019 (88 pages).
International Search Report and Written Opinion from PCT/1B2019/054612 dated Sep. 26, 2019 (17 pages).
International Search Report and Written Opinion from PCT/1B2019/054614 dated Aug. 27, 2019 (14 pages).
International Search Report and Written Opinion from PCT/1B2019/054650 dated Oct. 28, 2019 (20 pages).
Zhang et al. "CE4-related: History-based Motion Vector Prediction", Joint Video Experts Team (JVET) of ITU-T SG 6 WP 3 and ISO/IEC JTC 1/SC 29/WG 11, 11th Meeting, Ljubljana, SI, (Jul. 10-18, 2018), Document JVET-K0104, 018.
Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 11-18, 2018, document No. JVET-K0248, 2018.
Hou et al. "Spatial-Temporal Merge Mode (Non Subblock STMVP)," Joint Video Exploration Team (JVET) of ITU-T SG 16 WP 3 and 1SO/IEC JTC 1/SC 29/WG 11, 11th Meeting: Ljubljana, SI, Jul. 10-18, 2018, document JVET-K0532, 2018.
Zhang et al. "CE4.2.14: Planar Motion Vector Prediction," Joint Video Experts Team (JVET) of ITU-T SG 16 and WP 3 and ISO/IEC JTC 1/SC 29/WG 11, 11th Meeting: Ljubljaba, SI, Jul. 10-18, 2018, document JVET-K0135, 2018.
Hsiao et al. "CE4.2.8: Merge Mode Enhancement," Joint Video Experts Team (JVET of ITU-T SG 16 WP 3 and ISO/IEC JTC 1/SC 29/WG 11, 11th Meeting: Ljubljana, SI, Jul. 10-18, 2018, document JVET-K0245, 2018.
Sullivan et al. "Overview of the High Efficiency Video Coding (HEVC) Standard," IEEE Transactions on Circuits and Systems for Video Technology, Dec. 2012, 22(12):1649-1668.
Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G1001, 2011.
JEM-7.0: https://jvet.hhi.fraunhofer.de/svn/svn_HMJEMSoftware/tags/ HM-16.6-JEM-7.0, Nov. 12, 2021.
"High Efficiency Video Coding" Series H: Audiovisual and Multimedia Systems: Infrastructure of Audiovisual Services—Coding of Moving Video, ITU-T, H.265, 2018.
Li al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.
Chen et al. "Description of SOR, HOR and 360 degree Video Coding Technology Proposal by Qualcomm and Technicolor—low and high complexity versions," Joint Video Exploration Team {JVET) of ITU-T SG 16 WP 3 and ISO/IEC JTC 1/SC 29/WG 11, 10th Meeting, San Diego, US, Apr. 10-20, 2018, document JVET-J0021, 2018.
Chen et al. "Description of SOR, HOR and 360 degree Video Coding Technology Proposal by Qualcomm and Technicolor—low and high complexity versions," Joint Video Exploration Team {JVET) of ITU-T SG 16 WP 3 and ISO/IEC JTC 1/SC 29/WG 11, 10th Meeting, San Diego, US, Apr. 10-20, 2018, document JVET-J0021-v5, 2018.
Chen et al. "EE3: Generalized Bi-Prediction," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0102, 2016.
Li et al. "Non-CE4: Harmonization between HMVP and GBI," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0264, 2019.
Xu et al. "CE8-Related Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0843, 2019.
Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1024, 2018.
Han et al. "CE4-Related: Modification on Merge List," Joint Video Exploration Team {JVET) of ITU-T SG 16 WP 3 and ISO/IEC JTC 1/SC 29/WG 11, 13th Meeting, Marrakech, MA, Jan. 9-18, 2019, document JVET-M0127, 2019.
Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, documentJVET-L0090, 2019.
Liao et al. "CE10.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124. 2018.
Lee et al. "Unified Condition for Affine Merge and Affine Inter Mode," Joint Video Exploration Team (JVET) of ITU-T SG 16 WP 3 and 1SO/IEC JTC 1/SC 29/WG 11, 5th Meeting, Geneva, CH, Jan. 12-20, 2017, JVET-E0039, 2017.
Zhang et al. "CE4-Related: Simplified Affine Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0103. 2018.
Hsu et al. "Description of SDR Video Coding Technology Proposal by MediaTek," Joint Video Experts Team (JVET) of ITU-T SG 16 WP 3 and Iso/IEC JTC 1/SC 29/WG 11, 1oth Meeting, San Diego, US, Apr. 10-20, 2018, document JVET-J0018, 2018.
Zhang et al. "CE4: Affine Prediction with 4×4 Sub-blocks for Chroma Components (Test 4.1.16)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0265, 2018.
Zhang et al. "CE3-Related: Modified Chroma Derived Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0272, 2018.

(56) References Cited

OTHER PUBLICATIONS

Zhang et al. "Adaptive Motion Vector Resolution Rounding Align," Joint Video Experts Team (JVET) of ITU-T SG 16 WP 3 and ISO/IEC JTC 1/SC 2/WG 11, 12th Meeting, Macao, CN, Oct. 3-12, 2018, document JVET-L0377, 2018.

Zhang et al. "Rotate Intra Block Copy for Still Image Coding," 2015 IEEE International Conference on Image Processing (ICIP), IEEE, Sep. 27, 2015, pp. 4102-4106.

Zou et al. "Improved Affine Motion Prediction," Joint Video Exploration Team (JVET) of ITU-T SG 16 WP3 and ISO/IEC JTC 1/SC 29/WG 11, 3rd Meeting, Geneva, CH, May 26-Jun. 1, 2016, document JVET-C0062, 2016.

He et al. "Non-SCCE1: Improved Intra Block Copy Coding with Block Vector Derivation," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2017, document JCTVC-R0165, 2014.

Toma et al. "Description of SOR Video Coding Technology Proposal by Panasonic," Joint Video Experts Team (JVET) of ITU-T SG 16 WP 3 and ISO/IEC JTC 1/SC 29NvG 11, 10th Meeting San Diego, US, Apr. 10-20, 2018, document JVET-J0020, 2018.

Xu et al. "Intra Block Copy in HEVC Screen Content Coding Extensions," IEEE Journal on Emerging and Selected Topics in Circuits and Systems, Dec. 2016, 6(4):409-419.

Chien et al. "Modification of Merge Candidate Derivation," Joint Video Exploration Team (JVET) of ITU-T SG 16 WP 3 and ISO/IEC JTC 1/SC 29/WG 11, 2nd Meeting, San Diego, USA, Feb. 20-26, 2016, document JVET-B0058, 2016.

Zhang et al. "On Adaptive Motion Vector Resolution," Joint Collaborative Team on Video Coding (JCT-VG) of ITU-T SG 16 WP 3 and 1SO/IEC JTC 1/SC 29/WG 11, 20th Meeting, Geneva, CH, Feb. 10-18, 2015, document JCTVC-T0059, 2015.

Li et al. "Adaptive Motion Vector Resolution for Screen Content," Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, document JCTVC-S0085, 2014.

Chen et al. "DMVR Extension baed on Template Matching," Joint Video Exploration Team (JVET) of ITU-T SG 16 WP and ISO/IEC JTC 1/SC 29/WG 11, 1oth Meeting, San Diego, US, Apr. 10-20, 2018, document JVET-J0057, 2018.

Sullivan et al. "Meeting Report of the 18th Meeting of the Joint Collaborative Team on Video Coding (JCT-VC), Sapporo, JP, Jun. 30-Jul. 9, 2014", Joint Collaborative Team on Video Coding (JCT-VC) of ITU-T SG16 WP3 and ISO/IEC JTC1/SC29/WG11, 18th Meeting: Sapporo, JP, Jun. 30-Jul. 9, 2014, JCTVC-R_Notes_d, 2014.

Chen et al. "Description of SOR, HOR and 360 degree Video Coding Technology Proposal by Huawei, GoPro, HiSilicon, and Samsung," Joint Video Exploration Team (JVET) of ITU-T SG 16 WP 3 and ISO/IEC JTC 1/SC 29/WG 1, 10th Meeting, San Diego, US, Apr. 10-20, 2018, document JVET-J0025, 2018.

Li et al. "Combining Directional Intra Prediction and Intra Block Copy with Block Partitioning for HEVC," 2016 IEEE International Conference on Image Processing (ICIP), Phoenix, AZ, USA, 2016, pp. 524-528.

Alshin et al. "Bi-Directional Optical Flow for Improving Motion Compensation," 28th Picture Coding Symposium, PCS2010, Dec. 8, 2010, Nagoya, Japan, pp. 422-425.

Xu et al. "Non-CE8: Mismatch Between Text Specification and Reference Software on ATMVP Candidate Derivation When CPR is Enabled," Joint Video Experts Team (JVET) of ITU-T SG 16 WP 3 and ISO/IEC JTC 29/WG 11, 13th Meeting, Marrakech, MA, Jan. 9-18, 2019, document JVET-M0409, 2019.

Lai et al. "CE8-Related: Clarification on Interaction Between CPR and other Inter Coding Tools," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0175, 2019.

Jang et al. "Non-CE8: Modification on SbTMVP Process Regarding with CPR," Joint Video Experts Team (JVET) of ITU-T SG 16 WP3 and ISO/IEC JTC 1/SC 29/WG 11, 13th Meeting, Marrakech, MA, Jan. 9-18, 2019, document JVET-M0335, 2019.

Huang, Wanzhang, "Research on Side Information Generation of Distributed Video Coding," South China University of Technology, Guangzhou, China, 2012.

Zuo et al. "Intra Block Copy for Intra-Frame Coding," Joint Video Experts Team (JVET) of ITU-T SG 16 WP 3 and SO/IEC JTC 1/SC 29/WG 11 1oth Meeting: San Diego, US, Apr. 10-20, 2018, document JVET-J0042, 2018.

Zhao et al. "Intra Mini-Block Copy Algorithm for Screen Content Coding," Journal of Computer Applications, 2016, 36(7): 1938-1943.

Bross et al. "Versatile Video Coding (Draft 3)," Joint Video Experts Team (JVET) of ITU-T SG 16 WP 3 and 1SO/IEC JTC 1/SC 29/WG 11 12th Meeting, Macao, CN, Oct. 3-12, 2018. document JVET-L1001, 2018.

Zhang et al. "AHG16: Clean-up on MV Rounding," Joint Video Experts Team (JVET) of ITU-T SG 16 WP3 and ISO/IEC JTC 1/SC 29/WG 11, 13th Meeting, Marrakech, MA Jan. 9-18, 2019, document JVET-M0265, 2019.

Shimada et al. "Non-CE9/Non-CE13: Averaged Merge Candidate," Joint Collaborative Team on Video Coding (JCT-VC) of ITU-T SG16 WP3 and ISO/IEC JTC1/SC29/WG11 7th Meeting: Geneva, CH, Nov. 21-30, 2011, document JCTVC-G195, 2011.

Koyama et al. "Modification of Derivation Process of Motion Vector Information for Interlace Format," Joint Collaborative Team on Video Coding (JCT-VG) of ITU-T SG16 WP3 and 1SO/IEC JTC1/SC29/WG11 7th Meeting: Geneva, CH, Nov. 21-30, 2011, document JCTVC-G196, 2011.

Han et al."A Dynamic Motion Vector Referencing Scheme for Video Coding," 2016 IEEE International Conference on Image Processing (ICIP), 2016, pp. 2032-2036.

Extended European Search Report from European Patent Application No. 19882864.2 dated Mar. 21, 2022 (9 pages).

Non Final Office Action from U.S. Appl. No. 17/019,629 dated Jun. 8, 2022.

Final Office Action from U.S. Appl. No. 17/031,451 dated Dec. 21, 2021.

Notice of Allowance n from U.S. Appl. No. 17/071,357 dated Feb. 2, 2022.

Office Action from Indian Patent Application No. 202127002718 mailed Jan. 6, 2022.

Document: JVET-M0483, Chien, W., et al., "CE8-related: CPR mode signaling and interaction with inter coding tools," Joint Video Experts Team (JVET) of ITU-T SG 16 WP 3 and ISO/IEC JTC 1/SC 29/WG 11 13th Meeting: Marrakech, MA, Jan. 9-18, 2019, 6 pages.

Chinese Office Action from Chinese Application No. 202210483116.X dated May 29, 2024, 17 pages. With English Translation.

Chinese Office Action from Chinese Application No. 202210923862.6 dated Apr. 28, 2024, 9 pages. With English Translation.

Non-Final Office Action from U.S. Appl. No. 17/700,086 dated Mar. 28, 2024, 23 pages.

Document: JVET-M0483-r2, Chien, W-J., et al., "CE8-related: CPR mode signaling and interaction with inter coding tools," Joint Video Experts Team (JVET) of ITU-T SG 16 WP 3 and ISO/IEC JTC 1/SC 29/WG 11 13th Meeting: Marrakech, MA Jan. 9-18, 2019, 7 pages.

Japanese Office Action from Japanese Patent Application No. 2023-171770 dated Jun. 18, 2024, 10 pages.

Non-Final Office Action from U.S. Appl. No. 18/528,017 dated Jun. 20, 2024, 59 pages.

Non-Final Office Action from U.S. Appl. No. 17/700,086 dated Sep. 6, 2024, 22 pages.

Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v5, 374 Pages.

Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v7, 384 Pages.

Extended European Search Report for European Application No. 23213827.1, mailed Jan. 10, 2024, 14 Pages.

(56) References Cited

OTHER PUBLICATIONS

Final Office Action for U.S. Appl. No. 17/071,357, mailed Apr. 2, 2021, 12 Pages.
Han Y., et al., "CE4-Related: Modification on Merge List," Joint Video Exploration Team (JVET) of ITU-T SG 16 WP 3 and ISO/IEC JTC 1/SC 29/WG 11, 13th Meeting: Marrakech, MA, Jan. 9-18, 2019, 14 Pages.
International Search Report for International Application No. PCT/CN2021/117199, mailed Dec. 17, 2021, 2 pages.
ITU-T: "H.265: High Efficiency Video Coding ," Recommendation H.265, 1 Page, [Retrieved on Jun. 3, 2021] Retrieved from URL: https://www.itu.int/rec/T-REC-H.265.
Non Final Office Action from U.S. Appl. No. 17/525,745 dated Nov. 10, 2022.
Non-Final Office Action for U.S. Appl. No. 17/031,451, mailed Dec. 4, 2020, 11 Pages.
Non-Final Office Action for U.S. Appl. No. 17/700,086, mailed Jun. 23, 2023, 78 Pages.
Notice of Allowance for U.S. Appl. No. 17/412,771, mailed Sep. 1, 2023, 16 Pages.
Notice of Allowance for U.S. Appl. No. 17/412,771, mailed Dec. 28, 2023, 12 Pages.
Notice of Allowance from U.S. Appl. No. 17/525,745 dated May 30, 2023.
Notice of Allowance from U.S. Appl. No. 17/732,849 dated Sep. 22, 2023.
Zhang K., "Bog Report on CE4 Related Contributions," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0843-v1, 17 Pages.
Zhang L., et al., "CE4-Related: History-Based Motion Vector Prediction," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0104-v3, 6 Pages.
Notification to Grant Patent Right for Invention for Chinese Application No. 202210923862.6, mailed Oct. 24, 2024, 4 pages.
Hsiao Y-L., et al., "CE4.4.12: Pairwise Average Candidates," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0090-v1, 59 Pages.
Written Decision on Registration for Korean Application No. 10-2021-7013353, mailed Oct. 18, 2024, 10 pages.
Notice of Allowance for U.S. Appl. No. 18/528,017, mailed Oct. 17, 2024, 13 pages.

\* cited by examiner

ROUNDING IN PAIRWISE AVERAGE CANDIDATE CALCULATIONS

CROSS-REFERENCE TO RELATED APPLICATIONS

This application is a continuation of U.S. patent application Ser. No. 17/525,745, filed on Nov. 12, 2021, which is a continuation of U.S. patent application Ser. No. 17/161,391, filed on Jan. 28, 2021, which is a continuation of International Patent Application No. PCT/CN2019/117119, filed on Nov. 11, 2019, which claims the priority to and benefits of International Patent Application No. PCT/CN2018/114931, filed on Nov. 10, 2018. All the aforementioned patent applications are hereby incorporated by reference in their entireties.

TECHNICAL FIELD

The present disclosure is directed generally to image and video coding technologies.

BACKGROUND

Motion compensation is a technique in video processing to predict a frame in a video, given the previous and/or future frames by accounting for motion of the camera and/or objects in the video. Motion compensation can be used in the encoding and decoding of video data for video compression.

SUMMARY

Devices, systems, and methods related to unified rounding methods for sub-block based prediction for image and video coding are described.

In one representative aspect, the disclosed technology may be used to provide a method of video processing. This method includes generating, for a processing of a current block of video, a pairwise merge candidate based on a pair of motion candidates; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

MV*x=Shift(MV0x+MV1x,1) and MV*y=Shift(MV0y+MV1y,1), wherein Shift(x, s)=(x+off)>>s, wherein off and s are integers, and wherein >> represents a right shift operation.

In another representative aspect, the disclosed technology may be used to provide a method of video processing. This method includes generating, for a processing of a current block of video, a pairwise merge candidate based on a pair of motion candidates; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = SignShift(MV0x + MV1x, 1) \text{ and}$$
$$MV^*y = SignShift(MV0y + MV1y, 1),$$

wherein $$SignShift(x, s) = \begin{cases} (x + \text{off}) \gg s & x \geq 0 \\ -((-x + \text{off}) \gg s) & x < 0 \end{cases},$$

wherein off and s are integers, and wherein >> represents a snitt operation.

In yet another representative aspect, the disclosed technology may be used to provide a method of video processing. This method includes generating, for a processing of a current block of video, a pairwise merge candidate based on a pair of motion candidates; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = SignShift(MV0x + MV1x, 1) \text{ and}$$
$$MV^*y = SignShift(MV0y + MV1y, 1),$$

wherein $$SignShift(x, s) = \begin{cases} (x + \text{off}) \gg s & x \geq 0 \\ (x + \text{off} + 1) \gg s & x < 0 \end{cases},$$

wherein off and s are integers, and wherein >> represents a shift operation.

In yet another representative aspect, the disclosed technology may be used to provide a method of video processing. This method includes generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

MV*x=Shift(MV0x+MV1x,1) and MV*y=Shift(MV0y+MV1y,1), wherein Shift(x, s)=(x+off)>>s, wherein off and s are integers, and wherein >> represents a right shift operation.

In yet another representative aspect, the disclosed technology may be used to provide a method of video processing. This method includes generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the Dairwise merge candidate such that:

$$MV^*x = SignShift(MV0x + MV1x, 1) \text{ and}$$

$$MV^*y = SignShift(MV0y + MV1y, 1),$$

wherein $$SignShift(x, s) = \begin{cases} (x + \text{off}) \gg s & x \geq 0 \\ -((-x + \text{off}) \gg s) & x < 0 \end{cases},$$

wherein off and s are integers, and wherein >> represents a shift operation.

In yet another representative aspect, the disclosed technology may be used to provide a method of video processing.

This method includes generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = SignShift(MV0x + MV1x, 1) \text{ and}$$

$$MV^*y = SignShift(MV0y + MV1y, 1),$$

wherein $$SignShift(x, s) = \begin{cases} (x + \text{off}) \gg s & x \geq 0 \\ (x + \text{off} + 1) \gg s & x < 0 \end{cases},$$

wherein off and s are integers, and wherein >> represents a shift operation.

In yet another representative aspect, the disclosed technology may be used to provide a method of video processing.

This method includes generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

MV*x=(Shift(MV0x+MV1x,(W+1)))<<W and

MV*y=(Shift(MV0y+MV1y,(W+1)))<<W, wherein Shift(x, s)=(x+off)>>s, wherein W, off and s are integers, and wherein >> represents a right shift operation.

In yet another representative aspect, the disclosed technology may be used to provide a method of video processing.

This method includes generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = (SignShift(MV0x + MV1x, (W + 1))) \ll W \text{ and}$$

$$MV^*y = (SignShift(MV0y + MV1y, (W + 1))) \ll W,$$

wherein $$SignShift(x, s) = \begin{cases} (x + \text{off}) \gg s & x \geq 0 \\ -((-x + \text{off}) \gg s) & x < 0 \end{cases},$$

wherein W, off and s are integers, and wherein >> represents a shift operation.

In yet another representative aspect, the disclosed technology may be used to provide a method of video processing.

This method includes generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = (SignShift(MV0x + MV1x, (W + 1))) \ll W \text{ and}$$

$$MV^*y = (SignShift(MV0y + MV1y, (W + 1))) \ll W,$$

wherein $$SignShift(x, s) = \begin{cases} (x + \text{off}) \gg s & x \geq 0 \\ (x + \text{off} + 1) \gg s & x < 0 \end{cases},$$

wherein W, off and s are integers, and wherein >> represents a shift operation.

In yet another representative aspect, the disclosed technology may be used to provide a method of video processing.

This method includes generating, for a current block of video coded using a geometry partition mode, a uni-prediction motion candidate based on a scaled motion vector and a List0 motion vector; and performing, based on the uni-prediction motion candidate, a conversion between the current block and a bitstream representation of the video, wherein the scaled motion vector is MV1'=(MV1'x, MV1'y) and the List0 motion vector is MV0=(MV0x, MV0y), and wherein MV*=(MV*x, MV*y) is the uni-prediction motion candidate such that:

MV*x=Shift(MV0x+MV1'x,1) and MV*y=Shift(MV0y+MV1'y,1), wherein Shift(x, s)=(x+off)>>s, wherein off and s are integers, and wherein >> represents a right shift operation.

In yet another representative aspect, the disclosed technology may be used to provide a method of video processing.

This method includes generating, for a current block of video coded using a geometry partition mode, a uni-prediction motion candidate based on a scaled motion vector and a List0 motion vector; and performing, based on the uni-prediction motion candidate, a conversion between the current block and a bitstream representation of the video, wherein the scaled motion vector is MV1'=(MV1'x, MV1'y) and the List0 motion vector is MV0=(MV0x, MV0y), and wherein MV*=(MV*x, MV*y) is the uni-prediction motion candidate such that:

$$MV^*x = (SignShift(MV0x + MV1'x, 1) \text{ and}$$

$$MV^*y = (SignShift(MV0y + MV1'y, 1),$$

wherein $$SignShift(x, s) = \begin{cases} (x + \text{off}) \gg s & x \geq 0 \\ -((-x + \text{off}) \gg s) & x < 0 \end{cases},$$

wherein off and s are integers, and wherein >> represents a shift operation.

In yet another representative aspect, the disclosed technology may be used to provide a method of video processing.

This method includes generating, for a current block of video coded using a geometry partition mode, a uni-prediction motion candidate based on a scaled motion vector and a List0 motion vector; and performing, based on the uni-prediction motion candidate, a conversion between the current block and a bitstream representation of the video, wherein the scaled motion vector is MV1'=(MV1'x, MV1'y) and the List0 motion vector is MV0=(MV0x, MV0y), and wherein MV*=(MV*x, MV*y) is the uni-prediction motion candidate such that:

$$MV^*x = (SignShift(MV0x + MV1'x, 1) \text{ and}$$

$$MV^*y = (SignShift(MV0y + MV1'y, 1),$$

wherein $$SignShift(x, s) = \begin{cases} (x + \text{off}) \gg s & x \geq 0 \\ (x + \text{off} + 1) \gg s & x < 0 \end{cases},$$

wherein off and s are integers, and wherein >> represents a shift operation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description, and the claims.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Figure 1:
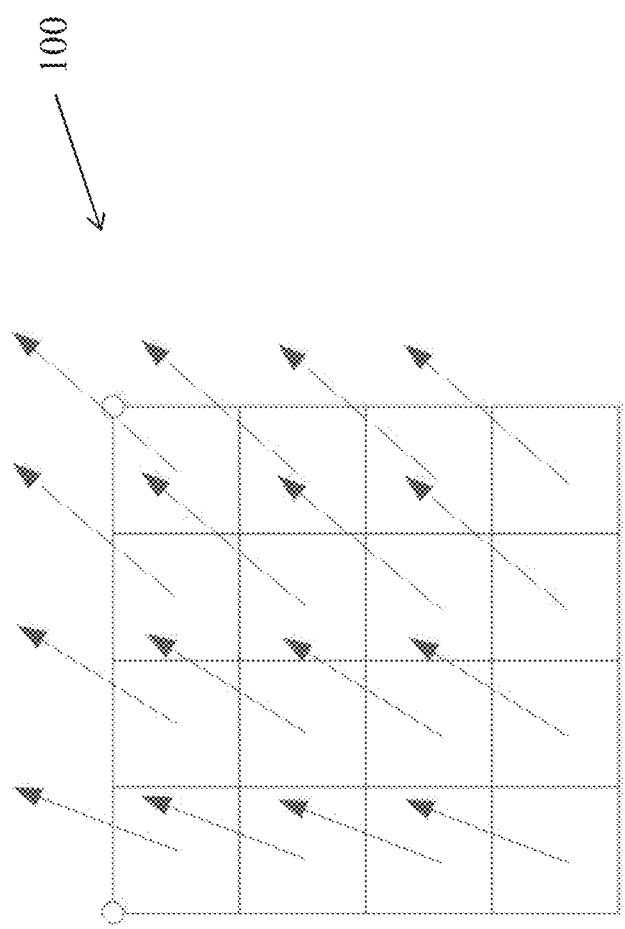
FIG. 1 shows an example of sub-block based prediction.

Sub-block based prediction is first introduced into the video coding standard by the HEVC standard. With sub-block based prediction, a block, such as a Coding Unit (CU) or a Prediction Unit (PU), is divided into several non-overlapped sub-blocks. Different sub-blocks may be assigned different motion information, such as reference index or motion vector (MV), and motion compensation (MC) is performed individually for each sub-block. FIG. 1 shows an example of sub-block based prediction.

Embodiments of the disclosed technology may be applied to existing video coding standards (e.g., HEVC, H.265) and future standards to improve runtime performance. Section headings are used in the present disclosure to improve readability of the description and do not in any way limit the discussion or the embodiments (and/or implementations) to the respective sections only.

1 Examples of the Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

1.1 Examples of Affine Prediction

Figure 2:
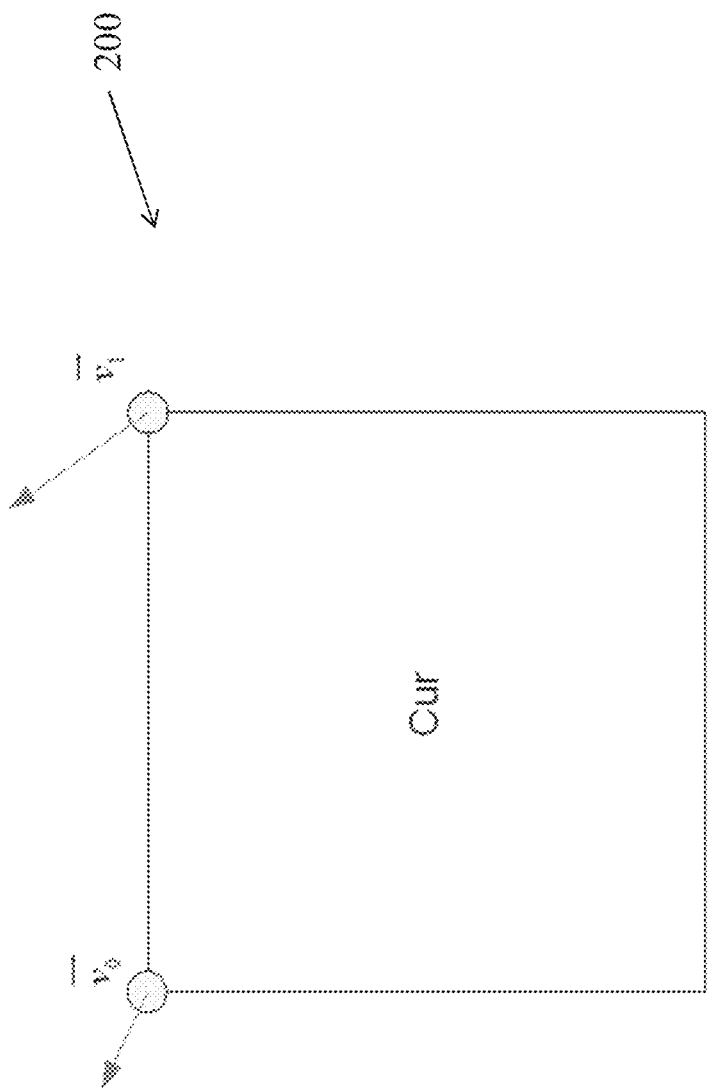
FIG. 2 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 2 shows an example of an affine motion field of a block 200 described by two control point motion vectors $V_0$ and $V_1$. The motion vector field (MVF) of the block 200 can be described by the following eauation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. (1)}$$

As shown in FIG. 2, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = clip3\left(4, w, \frac{w \times MvPre}{\max(abs(v_{1x} - v_{0x}), abs(v_{1y} - v_{0y}))}\right) \\ N = clip3\left(4, h, \frac{h \times MvPre}{\max(abs(v_{2x} - v_{0x}), abs(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 3:
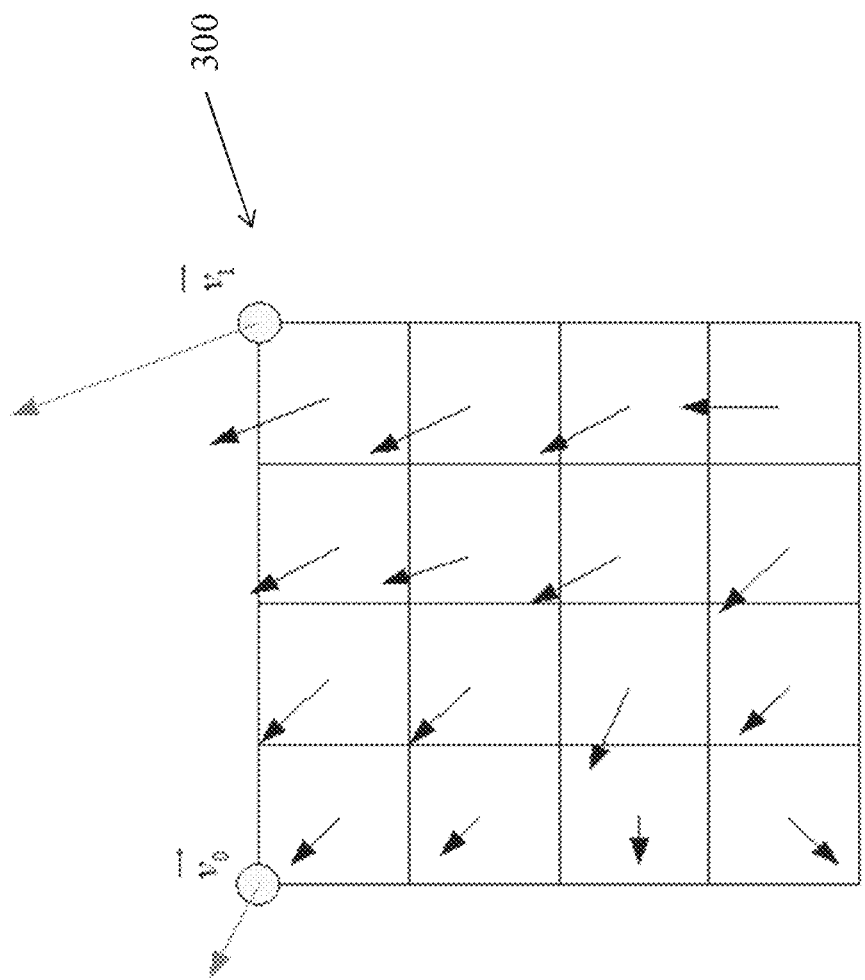
FIG. 3 shows an example of an affine motion vector field (MVF) per sub-block.

FIG. 3 shows an example of affine MVF per sub-block for a block 300. To derive motion vector of each MxN sub-block, the motion vector of the center sample of each sub-block can be calculated according to Eq. (1) and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0=\{v_A, v_B, v_c\}, v_1=\{v_D,v_E\}\}$ is constructed using the neighboring blocks.

Figure 4:
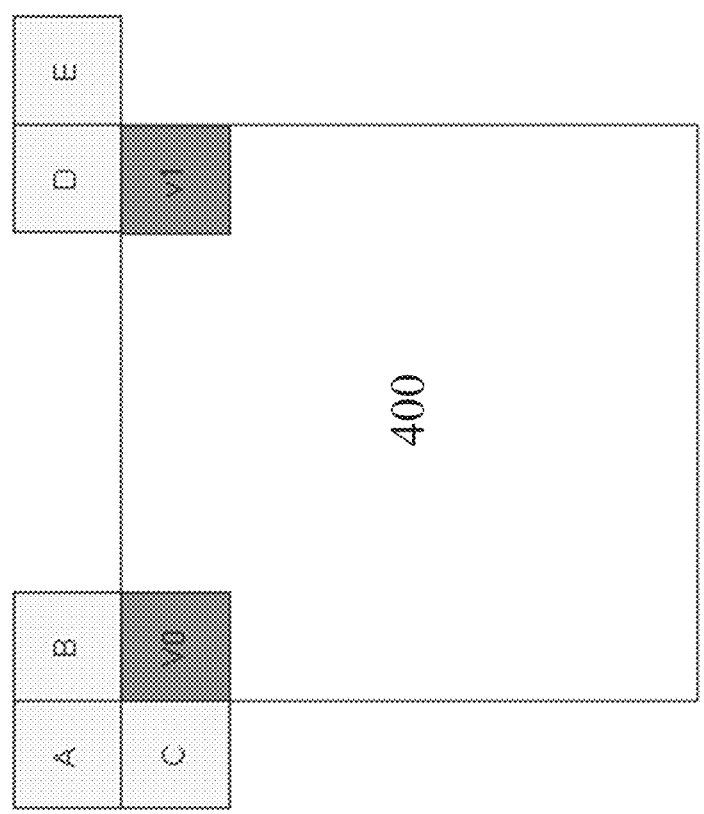
FIG. 4 shows an example of motion vector prediction (MVP) for the AF_INTER affine motion mode.

FIG. 4 shows an example of motion vector prediction (MVP) for a block 400 in the AF_INTER mode. As shown in FIG. 4, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

Figures 5A, 5B:
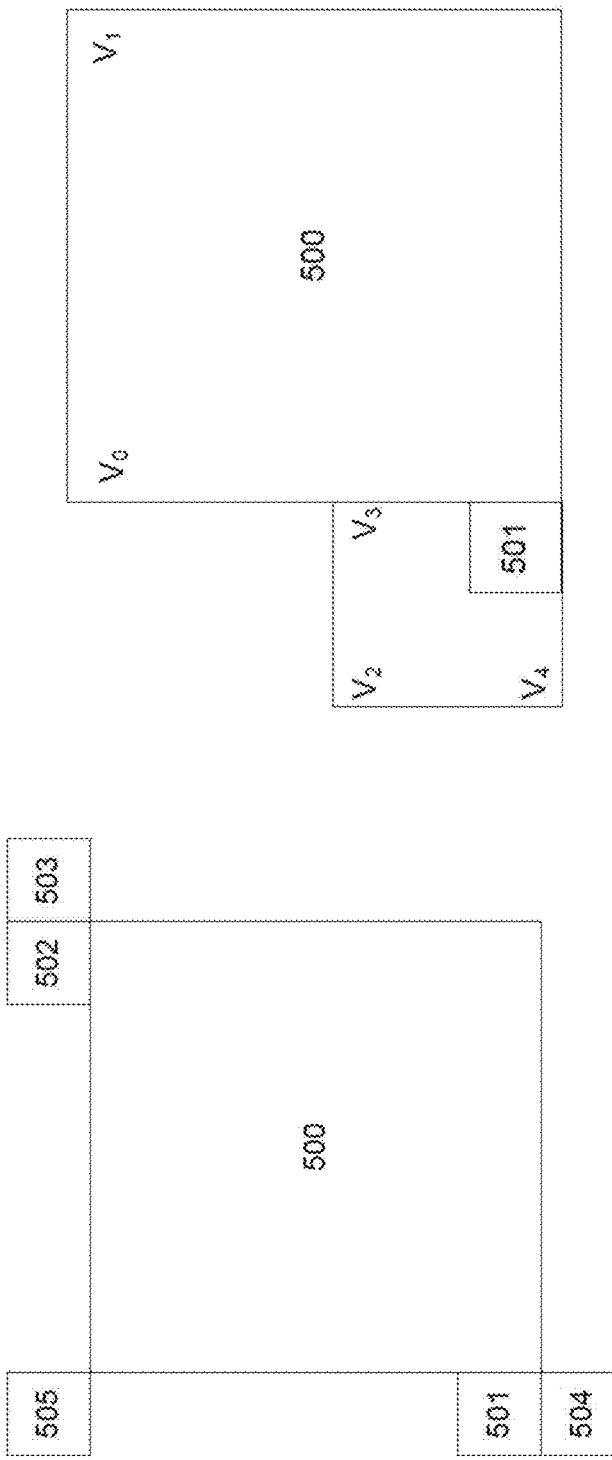
FIGS. 5A and 5B show example candidates for the AF_MERGE affine motion mode.

When a CU is applied in AF_MERGE mode, it gets the first block coded with an affine mode from the valid neighboring reconstructed blocks. FIG. 5A shows an example of the selection order of candidate blocks for a current CU 500. As shown in FIG. 5A, the selection order can be from left (501), above (502), above right (503), left bottom (504) to above left (505) of the current CU 500. FIG. 5B shows another example of candidate blocks for a current CU 500 in the AF_MERGE mode. If the neighboring left bottom block 501 is coded in affine mode, as shown in FIG. 5B, the motion vectors $v_2$, $v_3$ and $v_4$ of the top left corner, above right corner, and left bottom corner of the CU containing the sub-block 501 are derived. The motion vector $v_0$ of the top left corner on the current CU 500 is calculated based on $v_2$, $v_3$ and $v_4$. The motion vector v1 of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

In JEM, the non-merge affine mode can be used only when the width and the height of the current block are both larger than 8; the merge affine mode can be used only when the area (i.e. width×height) of the current block is not smaller than 64.

1.2 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 6:
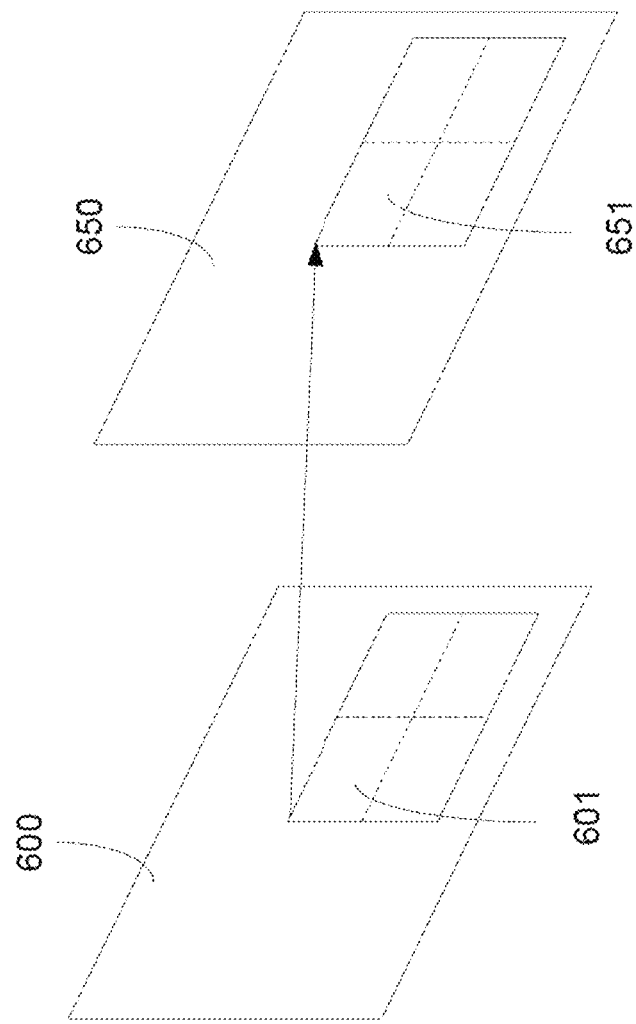
FIG. 6 shows an example of motion prediction using the alternative temporal motion vector prediction (ATMVP) algorithm for a coding unit (CU).
Figure 6:
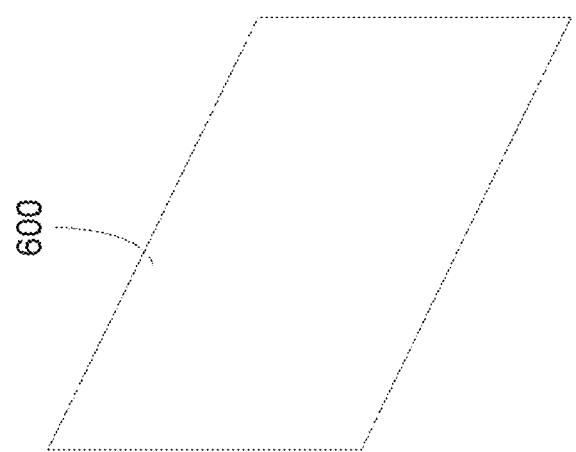

FIG. 6 shows an example of ATMVP motion prediction process for a CU 600. The ATMVP method predicts the motion vectors of the sub-CUs 601 within a CU 600 in two steps. The first step is to identify the corresponding block 651 in a reference picture 650 with a temporal vector. The reference picture 650 is also referred to as the motion source picture. The second step is to split the current CU 600 into sub-CUs 601 and obtain the motion vectors as well as the reference indices of each sub-CU from the block corresponding to each sub-CU.

In the first step, a reference picture 650 and the corresponding block is determined by the motion information of the spatial neighboring blocks of the current CU 600. To avoid the repetitive scanning process of neighboring blocks, the first merge candidate in the merge candidate list of the current CU 600 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 651 is identified by the temporal vector in the motion source picture 650, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1-X) for each sub-CU.

1.3 Examples of Spatial-Temporal Motion Vector Prediction (STMVP)

Figure 7:
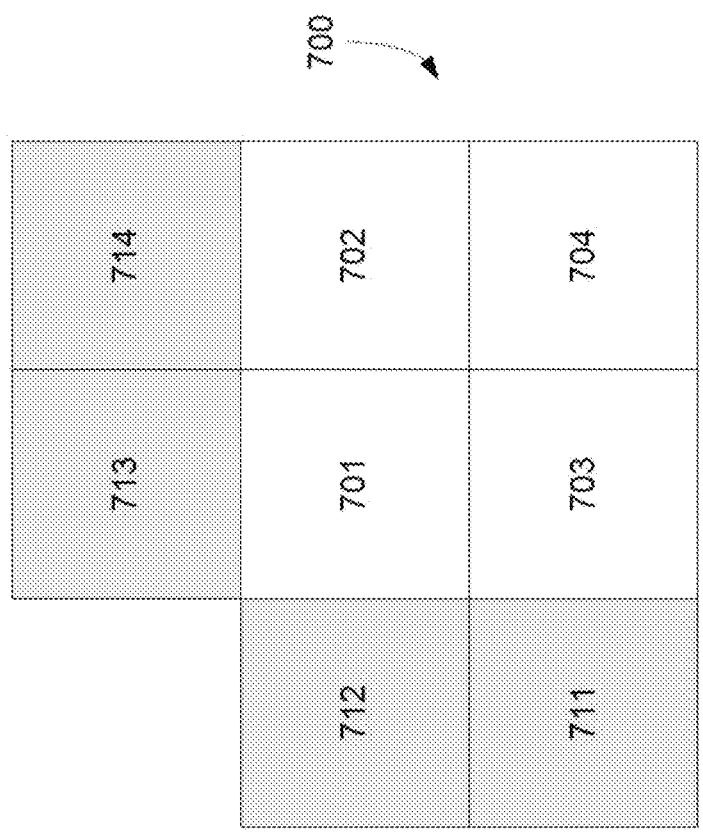
FIG. 7 shows an example of a CU with sub-blocks and neighboring blocks used by the spatial-temporal motion vector prediction (STMVP) algorithm.

In the STMVP method, the motion vectors of the sub-CUs are derived recursively, following raster scan order. FIG. 7 shows an example of one CU with four sub-blocks and neighboring blocks. Consider an 8×8 CU 700 that includes four 4×4 sub-CUs A (701), B (702), C (703), and D (704). The neighboring 4×4 blocks in the current frame are labelled as a (711), b (712), c (713), and d (714).

The motion derivation for sub-CU A starts by identifying its two spatial neighbors. The first neighbor is the N×N block above sub-CU A 701 (block c 713). If this block c (713) is not available or is intra coded the other N×N blocks above sub-CU A (701) are checked (from left to right, starting at block c 713). The second neighbor is a block to the left of the sub-CU A 701 (block b 712). If block b (712) is not available or is intra coded other blocks to the left of sub-CU A 701 are checked (from top to bottom, staring at block b 712). The motion information obtained from the neighboring blocks for each list is scaled to the first reference frame for a given list. Next, temporal motion vector predictor (TMVP) of sub-block A 701 is derived by following the same procedure of TMVP derivation as specified in HEVC. The motion information of the collocated block at block D 704 is fetched and scaled accordingly. Finally, after retrieving and scaling the motion information, all available motion vectors are averaged separately for each reference list. The averaged motion vector is assigned as the motion vector of the current sub-CU.

1.4 Examples of Bi-Directional Optical Flow (BIO)

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \qquad \text{Eq. (3)}$$

Combining this optical flow equation with Hermite interpolation for the motion trajectory of each sample results in a unique third-order polynomial that matches both the function values $I^{(k)}$ and $\partial I^{(k)}/\partial x$, $\partial I^{(k)}/\partial y$ derivatives at the ends. The value of this polynomial at t=0 is the BIO prediction:

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \qquad \text{Eq. (4)}$$

Figure 8:
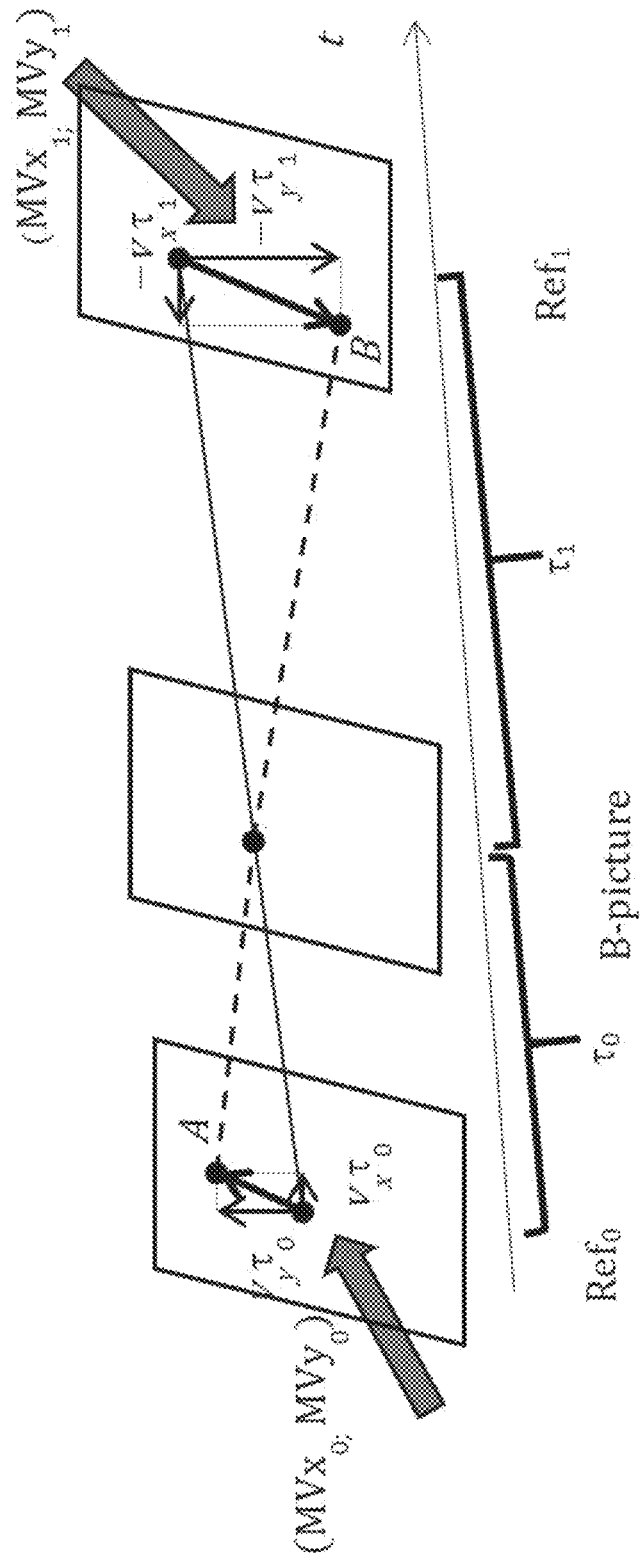
FIG. 8 shows an example of an optical flow trajectory used by the bi-directional optical flow (BIO) algorithm.

FIG. 8 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0 = \text{POC(current)} - \text{POC}(\text{Ref}_0)$, $\tau_1 = \text{POC}(\text{Ref}_1) - \text{POC(current)}$. If both predictions come from the same time direction (either both from the past or both from the future) then the signs are different (e.g., $\tau_0 \cdot \tau_1 < 0$). In this case, BIO is applied if the prediction is not from the same time moment (e.g., $\tau_0 \neq \tau_1$). Both referenced regions have non-zero motion (e.g., $\text{MVx}_0, \text{MVy}_0, \text{MVx}_1, \text{MVy}_1 \neq 0$) and the block motion vectors are proportional to the time distance (e.g., $\text{MVx}_0/\text{MVx}_1 = \text{MVy}_0/\text{MVy}_1 = -\tau_0/\tau_1$).

Figure 9B:
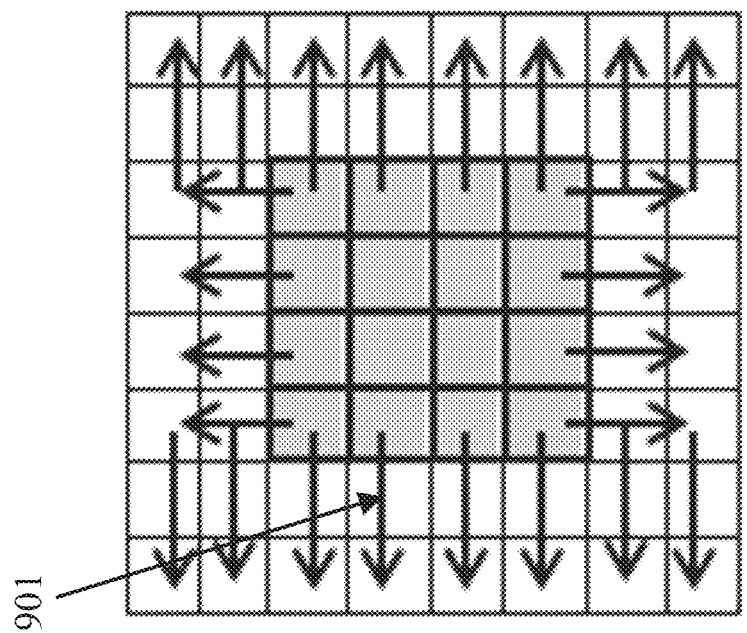
FIGS. 9A and 9B show example snapshots of using of the bi-directional optical flow (BIO) algorithm without block extensions.
Figure 9A:
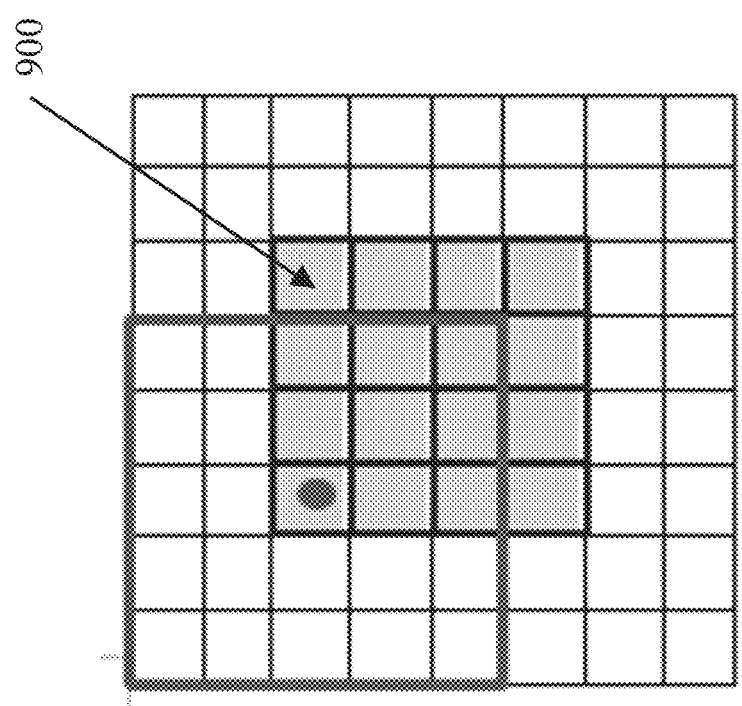

The motion vector field $(v_x, v_y)$ is determined by minimizing the difference $\Delta$ between values in points A and B. FIGS. 9A-9B show an example of intersection of motion trajectory and reference frame planes. Model uses only first linear term of a local Taylor expansion for $\Delta$:

$$\Delta = I^{(0)} - I^{(1)} + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \qquad \text{Eq. (5)}$$

All values in the above equation depend on the sample location, denoted as (i', j'). Assuming the motion is consistent in the local surrounding area, A can be minimized inside the (2M+1)×(2M+1) square window SI centered on the currently predicted point (i,j), where M is equal to 2:

$$(v_x, v_y) = \arg\min_{v_x,v_y} \sum_{[i',j']\in\Omega} \Delta^2[i', j'] \quad \text{Eq. (6)}$$

For this optimization problem, the JEM uses a simplified approach making first a minimization in the vertical direction and then in the horizontal direction. This results in the following:

$$v_x = (s_1 + r) > m?\ \text{clip3}\left(-thBIO,\ thBIO,\ -\frac{s_3}{(s_1+r)}\right):0 \quad \text{Eq. (7)}$$

$$v_y = (s_5 + r) > m?\ \text{clip3}\left(-thBIO,\ thBIO,\ -\frac{s_6 - v_x s_2/2}{(s_5+r)}\right):0 \quad \text{Eq. (8)}$$

where, $$s_1 = \sum_{[i',j']\in\Omega} \left(\tau_1 \partial I^{(1)}/\partial x + \tau_0 \partial I^{(0)}/\partial x\right)^2; \quad \text{Eq. (9)}$$

$$s_3 = \sum_{[i',j']\in\Omega} (I^{(1)} - I^{(0)})(\tau_1 \partial I^{(1)}/\partial x + \tau_0 \partial I^{(0)}/\partial x);$$

$$s_2 = \sum_{[i',j']\in\Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_5 = \sum_{[i',j']\in\Omega} \left(\tau_1 \partial I^{(1)}/\partial y + \tau_0 \partial I^{(0)}/\partial y\right)^2;$$

$$s_6 = \sum_{[i',j']\in\Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (7) and Eq. (8), where:

$$r = 500 \cdot 4^{d-8} \quad \text{Eq. (10)}$$

$$m = 700 \cdot 4^{d-8} \quad \text{Eq. (11)}$$

Here, d is bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 9A shows an example of access positions outside of a block 900. As shown in FIG. 9A, in Eq. (9), (2M+1)×(2M+1) square window SI centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 901, as shown in FIG. 9B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (9) of all samples in a 4×4 block can be aggregated, and then the aggregated values of $s_n$, in are used to derived BIO motion vectors offset for the 4×4 block. More specifically, the following formula can used for block-based BIO derivation:

$$s_{1,b_k} = \sum_{(x,y)\in b_k} \sum_{[i',j']\in\Omega(x,y)} \left(\tau_1 \partial I^{(1)}/\partial x + \tau_0 \partial I^{(0)}/\partial x\right)^2; \quad \text{Eq. (12)}$$

$$s_{3,b_k} = \sum_{(x,y)\in b_k} \sum_{[i',j']\in\Omega} (I^{(1)} - I^{(0)})(\tau_1 \partial I^{(1)}/\partial x + \tau_0 \partial I^{(0)}/\partial x);$$

-continued $$s_{2,b_k} = \sum_{(x,y)\in b_k} \sum_{[i',j']\in\Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_{5,b_k} = \sum_{(x,y)\in b_k} \sum_{[i',j']\in\Omega} \left(\tau_1 \partial I^{(1)}/\partial y + \tau_0 \partial I^{(0)}/\partial y\right)^2;$$

$$s_{6,b_k} = \sum_{(x,y)\in b_k} \sum_{[i',j']\in\Omega} (I^{(1)} - I^{(0)})(\tau_1 \partial I^{(1)}/\partial y + \tau_0 \partial I^{(0)}/\partial y)$$

Here, $b_k$ denotes the set of samples belonging to the k-th 4×4 block of the predicted block. $s_n$ in Eq (7) and Eq (8) are replaced by $((s_{n,bk})>>4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12\times2^{14-d}$; otherwise, it is set to $12\times2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient $\partial I/\partial x$, a signal is first interpolated vertically using BIOfilterS corresponding to the fractional position fracY with de-scaling shift d−8. Gradient filter BIOfilterG is then applied in horizontal direction corresponding to the fractional position fracX with de-scaling shift by 18−d. For vertical gradient $\partial I/\partial y$, a gradient filter is applied vertically using BIOfilterG corresponding to the fractional position fracY with de-scaling shift d−8. The signal displacement is then performed using BIOfilterS in horizontal direction corresponding to the fractional position fracX with de-scaling shift by 18−d. The length of interpolation filter for gradients calculation BIOfilterG and signal displacement BIOfilterF can be shorter (e.g., 6-tap) in order to maintain reasonable complexity. Table 2 shows example filters that can be used for gradients calculation of different fractional positions of block motion vector in BIO. Table 3 shows example interpolation filters that can be used for prediction signal generation in BIO.

TABLE 2

Example filters for gradient calculation in BIO

| Fractional pel position | Interpolation filter for gradient(BIOfilterG) | | | | | |
|---|---|---|---|---|---|---|
| 0 | { 8, | −39, | −3, | 46, | −17, | 5} |
| 1/16 | { 8, | −32, | −13, | 50, | −18, | 5} |
| 1/8 | { 7, | −27, | −20, | 54, | −19, | 5} |
| 3/16 | { 6, | −21, | −29, | 57, | −18, | 5} |
| 1/4 | { 4, | −17, | −36, | 60, | −15, | 4} |
| 5/16 | { 3, | −9, | −44, | 61, | −15, | 4} |
| 3/8 | { 1, | −4, | −48, | 61, | −13, | 3} |
| 7/16 | { 0, | 1, | −54, | 60, | −9, | 2} |
| 1/2 | { −1, | 4, | −57, | 57, | −4, | 1} |

TABLE 3

Example interpolation filters for prediction signal generation in BIO

| Fractional pel position | Interpolation filter for prediction signal(BIOfilterS) | | | | | |
|---|---|---|---|---|---|---|
| 0    | { 0, |  0, | 64, |  0, |   0, | 0} |
| 1/16 | { 1, | −3, | 64, |  4, |  −2, | 0} |
| 1/8  | { 1, | −6, | 62, |  9, |  −3, | 1} |
| 3/16 | { 2, | −8, | 60, | 14, |  −5, | 1} |
| 1/4  | { 2, | −9, | 57, | 19, |  −7, | 2} |
| 5/16 | { 3, | −10, | 53, | 24, | −8, | 2} |
| 3/8  | { 3, | −11, | 50, | 29, | −9, | 2} |
| 7/16 | { 3, | −11, | 44, | 35, | −10, | 3} |
| 1/2  | { 3, | −10, | 35, | 44, | −11, | 3} |

In the JEM, BIO can be applied to all bi-predicted blocks when the two predictions are from different reference pictures. When Local Illumination Compensation (LIC) is enabled for a CU, BIO can be disabled.

In some embodiments, OBMC is applied for a block after normal MC process. To reduce the computational complexity, BIO may not be applied during the OBMC process. This means that BIO is applied in the MC process for a block when using its own MV and is not applied in the MC process when the MV of a neighboring block is used during the OBMC process.

In JEM, BIO is only invoked for the luma component.

1.5 Examples of Frame-Rate Up Conversion (FRUC)

A FRUC flag can be signaled for a CU when its merge flag is true. When the FRUC flag is false, a merge index can be signaled, and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\}$$ Eq. (13)

Figure 10:
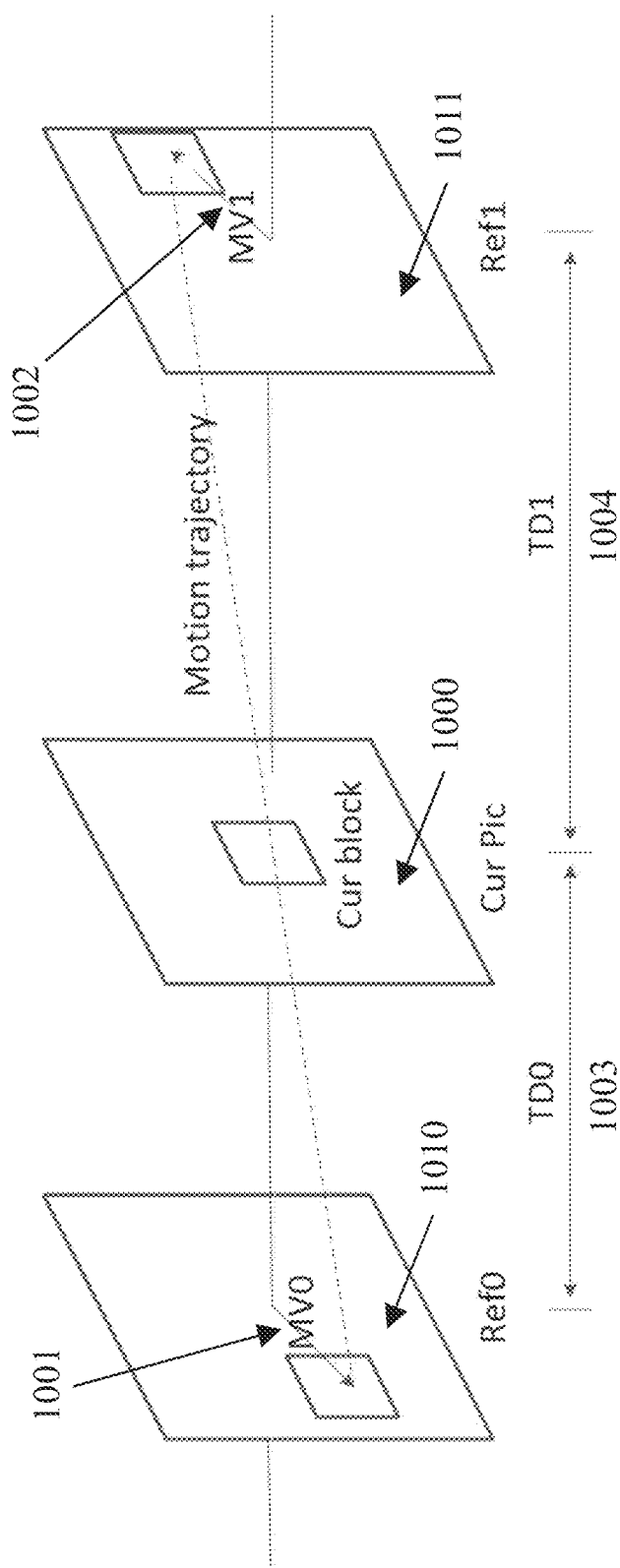
FIG. 10 shows an example of bilateral matching in the frame-rate up conversion (FRUC) algorithm.

FIG. 10 shows an example of bilateral matching used in the Frame-Rate Up Conversion (FRUC) method. The bilateral matching is used to derive motion information of the current CU by finding the closest match between two blocks along the motion trajectory of the current CU (1000) in two different reference pictures (1010, 1011). Under the assumption of continuous motion trajectory, the motion vectors MV0 (1001) and MV1 (1002) pointing to the two reference blocks are proportional to the temporal distances, e.g., TD0 (1003) and TD1 (1004), between the current picture and the two reference pictures. In some embodiments, when the current picture 1000 is temporally between the two reference pictures (1010, 1011) and the temporal distance from the current picture to the two reference pictures is the same, the bilateral matching becomes mirror based bi-directional MV.

Figure 11:
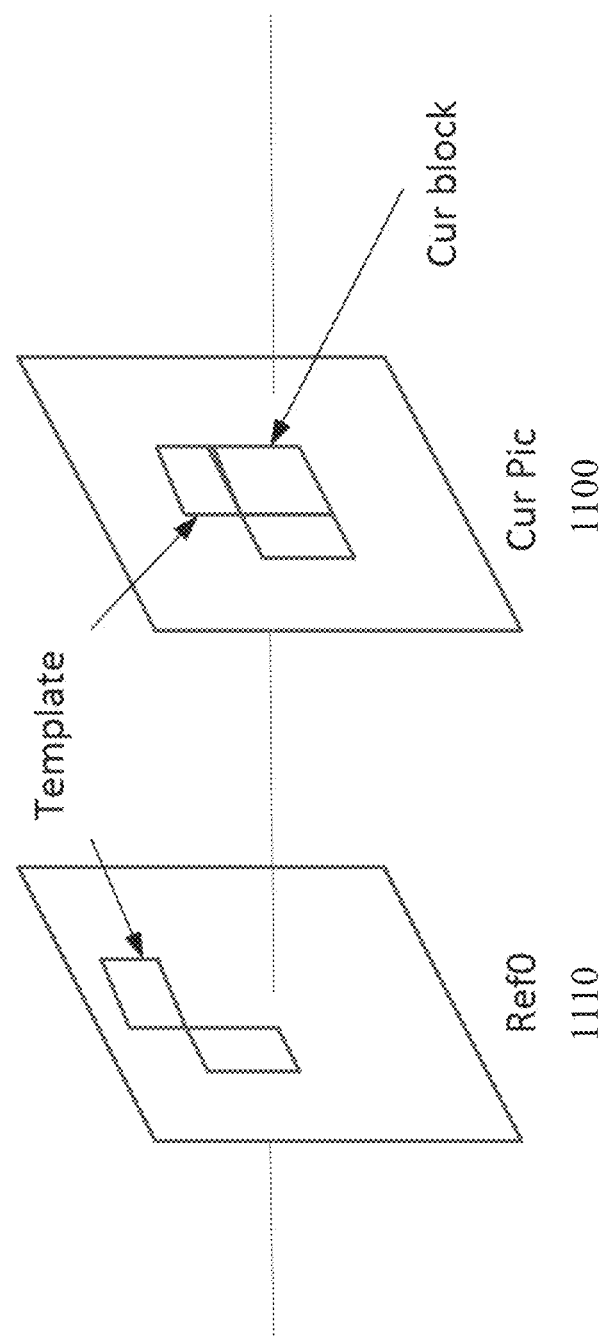
FIG. 11 shows an example of template matching in the FRUC algorithm.

FIG. 11 shows an example of template matching used in the Frame-Rate Up Conversion (FRUC) method. Template matching can be used to derive motion information of the current CU 1100 by finding the closest match between a template (e.g., top and/or left neighboring blocks of the current CU) in the current picture and a block (e.g., same size to the template) in a reference picture 1110. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $ref_a$) at reference list A. Then the reference picture $ref_b$ of its paired bilateral MV is found in the other reference list B so that $ref_a$ and $ref_b$ are temporally at different sides of the current picture. If such a refb is not available in reference list B, $ref_b$ is determined as a reference which is different from ref a and its temporal distance to the current picture is the minimal one in list B. After $ref_b$ is determined, MVb is derived by scaling MVa based on the temporal distance between the current picture and $ref_a$, $ref_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral ME. Then the motion field may be used later as CU level or sub-CU level MV candidates.

Figure 12:
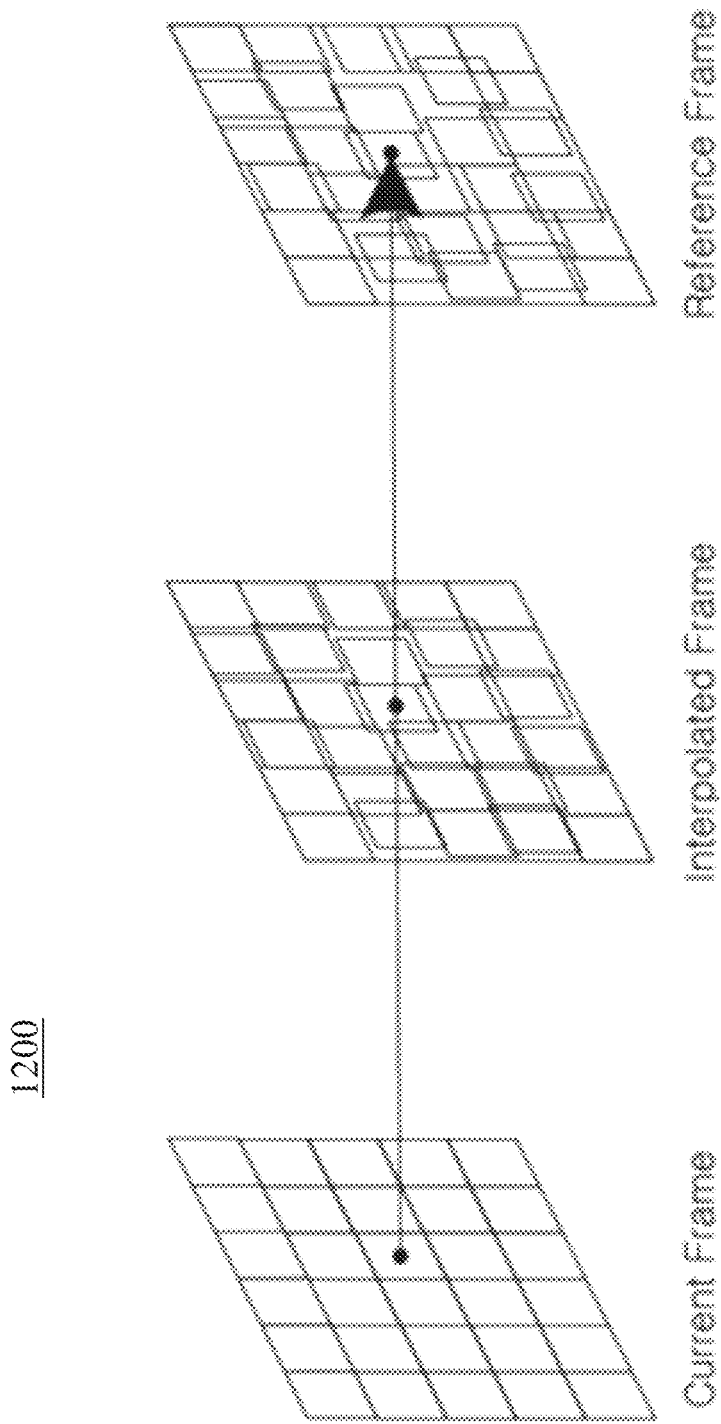
FIG. 12 shows an example of unilateral motion estimation in the FRUC algorithm.

In some embodiments, the motion field of each reference pictures in both reference lists is traversed at 4×4 block level. FIG. 12 shows an example of unilateral Motion Estimation (ME) 1200 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad \text{Eq. (14)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

```
If costBi <= factor * min (cost0, cost1)
    bi-prediction is used;
Otherwise, if cost0 <= cost1
    uni-prediction from list0 is used;
Otherwise,
    uni-prediction from list1 is used;
```

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

1.6 Examples of MV Derived for MC in Chroma Components

In an example, the HEVC standard defines how to derive the MV used for MC in chroma components (noted as mvC) from the MV used for MC in the luma component (noted as mv). Generally speaking, mvC is calculated as mv multiplying a factor, which relies on the color format, such as 4:2:0 or 4:2:2.

1.7 Examples of Current Picture Referencing in VVC

Intra block copy (IBC, or intra picture block compensation), also named current picture referencing (CPR) was adopted in HEVC screen content coding extensions (SCC). This tool is very efficient for coding of screen content video in that repeated patterns in text and graphics rich content occur frequently within the same picture. Having a previously reconstructed block with equal or similar pattern as a predictor can effectively reduce the prediction error and therefore improve coding efficiency.

Similar to the design of CRP in HEVC SCC, In VVC, The use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed on top of the existing VVC inter mode to signal the use of the IBC mode.

Features of this embodiment include:
  It is treated as a normal inter mode. Therefore, merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise a normal inter mode coded one with different pictures as reference pictures.
  Block vector prediction and coding schemes for the IBC mode reuse the schemes used for motion vector prediction and coding in the HEVC inter mode (AMVP and MVD coding).
  The motion vector for the IBC mode, also referred as block vector, is coded with integer-pel precision, but stored in memory in $\frac{1}{16}$-pel precision after decoding as quarter-pel precision is required in interpolation and deblocking stages. When used in motion vector prediction for the IBC mode, the stored vector predictor will be right shifted by 4.

Search range: it is restricted to be within the current CTU. CPR is disallowed when affine mode/triangular mode/GBI/weighted prediction is enabled.

1.8 Examples of Pairwise Average Candidates

Pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. The pairwise average candidates replace the combined candidates in HEVC standard. Suppose the MVs of two merge candidates are MV0=(MV0x, MV0y) and MV1=(MV1x, MV1y), then the MV of the pairwise merge candidate denoted as MV*=(MV*x, MV*y) is derived as $$MV^*x=(MV0x+MV1x)/2, \text{ and}$$

$$MV^*y=(MV0y+MV1y)/2.$$

In addition, when MV0 and MV1 refer to the current picture (i.e., CPR mode), MV*x and MV*y are further rounded to remove the part with a higher precision than full pixel to make sure the integer MV is obtained:

$$MV^*x=(MV^*x/16)<<4, \text{ and}$$

$$MV^*y=(MV^*y/16)<<4.$$

It is noted that for each pair, if one of the two is coded with CPR and the other is not, such pair is disallowed to generate the pairwise average candidate.

1.9 Examples of Triangular Prediction Mode

The concept of the triangular prediction mode (TPM) is to introduce a new triangular partition for motion compensated prediction. It splits a CU into two triangular prediction units, in either diagonal or inverse diagonal direction. Each triangular prediction unit in the CU is inter-predicted using its own uni-prediction motion vector and reference frame index which are derived from a single uni-prediction candidate list. An adaptive weighting process is performed to the diagonal edge after predicting the triangular prediction units. Then, the transform and quantization process are applied to the whole CU. It is noted that this mode is only applied to merge mode (note: skip mode is treated as a special merge mode). Uni-prediction candidate list for TPM.

The uni-prediction candidate list, named TPM motion candidate list, consists of five uni-prediction motion vector candidates. It is derived from seven neighboring blocks including five spatial neighboring blocks and two temporal co-located blocks. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:
(1) Obtain regular motion candidates from A1, B1, B0, A0, B2, Col1 and Col2 (similar as those in the regular merge mode) without any pruning operations.
(2) Set variable numCurrMergeCand=0
(3) For each regular motion candidates derived from A1, B1, B0, A0, B2, Col1 and Col2 and numCurrMergeCand is less than 5, if the regular motion candidate is uni-prediction (either from List 0 or List 1), it is directly added to the merge list as an TPM candidate with numCurrMergeCand increased by 1. Such a TPM candidate is named "originally uni-predicted candidate".

Full pruning is applied.
(4) For each motion candidates derived from A1, B1, B0, A0, B2, Col1 and Col2 and numCurrMergeCand is less than 5, if the regular motion candidate is bi-prediction, the motion information from List 0 is added to the TPM merge list (that is, modified to be uni-prediction from List 0) as a new TPM candidate and numCurrMergeCand increased by 1. Such a TPM candidate is named 'Truncated List0-predicted candidate'.

Full pruning is applied.
(5) For each motion candidates derived from A1, B1, B0, A0, B2, Col1 and Col2 and numCurrMergeCand is less than 5, if the regular motion candidate is bi-prediction, the motion information from List 1 is added to the TPM merge list (that is, modified to be uni-prediction from List 1) and numCurrMergeCand increased by 1. Such a TPM candidate is named 'Truncated List1—predicted candidate'.

Full pruning is applied.
(6) For each motion candidates derived from A1, B1, B0, A0, B2, Col1 and Col2 and numCurrMergeCand is less than 5, if the regular motion candidate is bi-prediction, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMergeCand increased by 1.

Full pruning is applied.
(7) If numCurrMergeCand is less than 5, zero motion vector candidates are added.

When inserting a candidate to the list, if it has to be compared to all previously added candidates to see whether it is identical to one of them, such a process is called full pruning.

Assume the scaled MV denoted by (MV1'x, MV1'y) and the List 0 MV by (MV0x, MV0y). The averaged uni-prediction from List 0 motion candidate denoted by (MV*x, MV*y) is defined as:

$$MV^*x=(MV0x+MV1'x+1)>>1, \text{ and}$$

$$MV^*y=(MV0y+MV1'y+1)>>1.$$

2 Drawbacks of Existing Implementations

Figure 13:
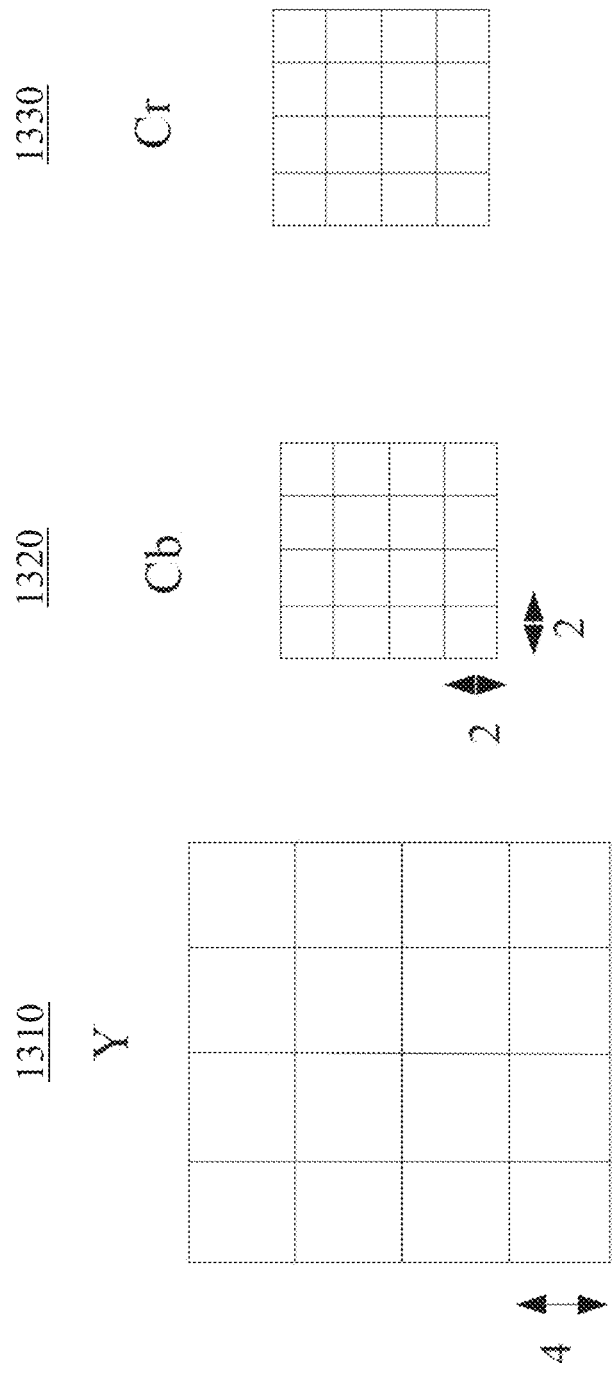
FIG. 13 shows an example of sub-blocks for different components with the 4:2:0 format in Joint Exploration Model (JEM).

The existing sub-block based prediction technologies have the following problems:
(1) In some existing implementations, the size of sub-blocks (such as 4×4 in JEM) is majorly designed for the luma component. In JEM, the size of sub-blocks for is 2×2 the chroma components with the 4:2:0 format, and 2×4 the chroma components with the 4:2:2 format. The small size of sub-blocks imposes a higher band-width requirement. FIG. 13 shows an example of sub-blocks of a 16×16 block (8×8 for Cb/Cr) for different components with the 4:2:0 format in JEM.
(2) In some existing sub-block based tools such as the affine prediction in JEM, MVs of each sub-block are calculated with the affine model as shown in equation (1) independently for each component, which results in misalignment of motion vectors between luma and chroma components.

(3) In some existing sub-block based tools such as affine prediction, the usage constrains are different for the merge mode and the non-merge inter mode (a.k.a. AMVP mode, or normal inter-mode), which need to be unified.

(4) In some existing implementations, the motion vector averaging operation to derive the pairwise merge candidate/averaged uni-prediction from List 0 motion candidate should be aligned with the rounding method used in the sub-block prediction. So, the hardware can have a unified design.

3 Exemplary Methods for Unified Rounding in Video Coding

Example 1. One block is divided into sub-blocks in different ways depending on the color component and/or the color format and/or block shape/size.

(a) For one luma and its corresponding chroma blocks (e.g., for 4:2:0 color format, one M×N luma block corresponds to one M/2×N/2 Cb block and one M/2×N/2 Cr block), the number of divided sub-blocks may be different for different components. The block is divided into more sub-blocks for a component if the block has a larger size for the component.

Figure 14:
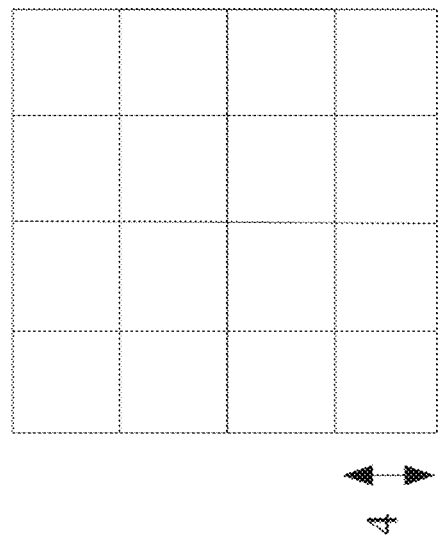
FIG. 14 shows an example of sub-blocks for different components with the 4:2:0 format in accordance with the disclosed technology.
Figure 14:
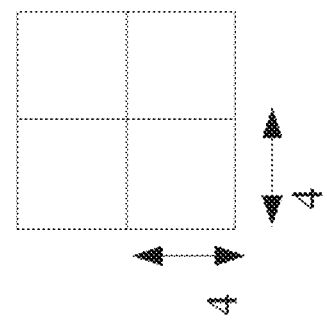
Figure 14:
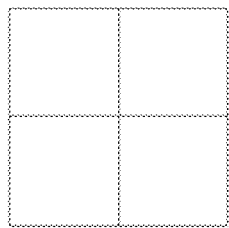

(b) For each color component, the size of sub-blocks is the same, e.g., w×h for Y, Cb and Cr component, where w×h can be 8×8, 8×4, 4×8, 4×4, etc. For example, w and h are both equal to 4. FIG. 14 shows an example of proposed sub-blocks of a 16×16 block (8×8 for Cb/Cr) for different components with the 4:2:0 format. In one example, if w>W or h>H, the block is not divided into sub-blocks for the component.

Figure 15:
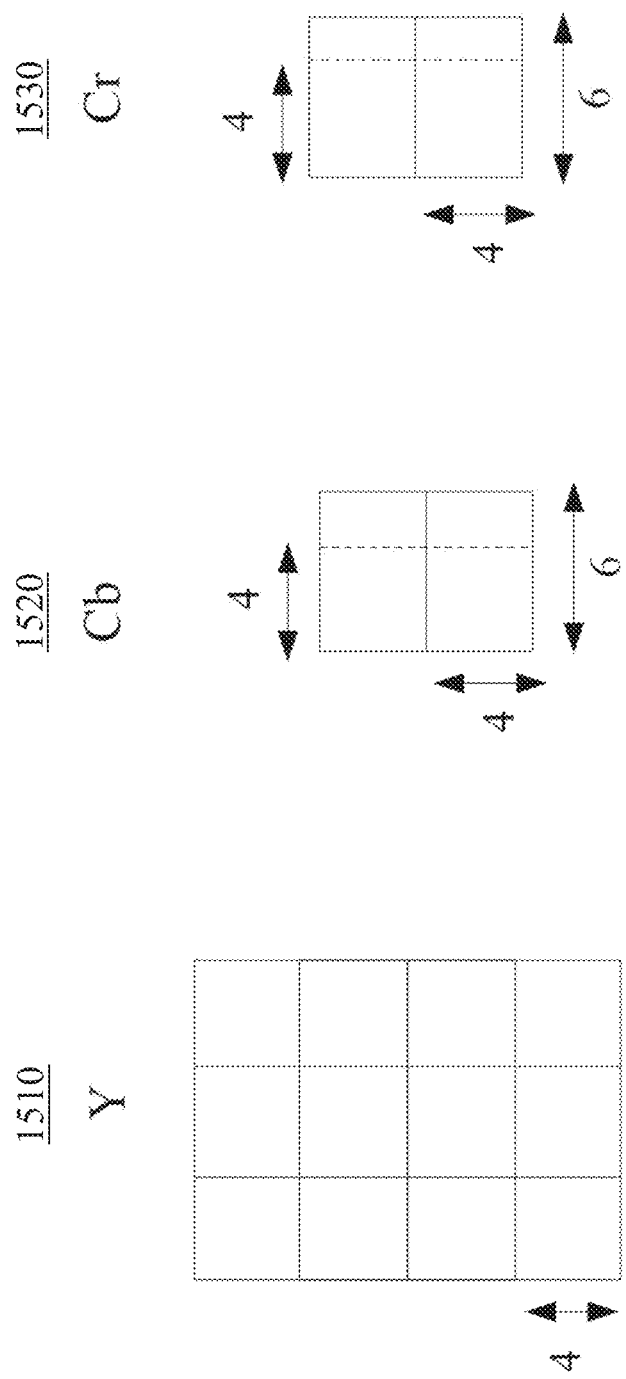
FIG. 15 shows another example of sub-blocks for different components with the 4:2:0 format in accordance with the disclosed technology.

(c) Different sizes of sub-block within one block may be allowed. In one example, if W (or H) is not an integer multiple of w (or h), it is proposed to merge the sub-blocks with width/height smaller than w/h into its adjacent left or above sub-block. FIG. 15 shows an example, where the 12×16 block (6×8 for Cb/Cr) is divided into sub-blocks. The sub-block size is 4×4. For Cb/Cr components, the size of last two sub-blocks is 2×4, so they are merged to their left neighboring blocks.

(d) Sub-block sizes may further depend on the block shape.
  (i) In one example, for square blocks (with W equal to H), w may be set equal to h.
  (ii) Alternatively, for non-square blocks (with W unequal to H), w may be unequal to h. For example, when W>H, w may be set larger than h, and versa vice.

(e) Sub-block sizes of different color components or different block shapes may be signaled in sequence parameter set (SPS), picture parameter set (PPS), slice header.

(f) Sub-block sizes of Y component and Cb/Cr components may be determined in different ways. For example, the sub-block size of Y component is adaptively determined from some candidates such as 4×4 8×8 4×8 and 8×4 but the sub-block size of Cb/Cr components are fixed to be 4×4.

(g) Sub-block sizes of Y component and Cb/Cr components may depend on the color formats, such as 4:2:0, 4:2:2 and 4:4:4.

Example 2. The MV of a sub-block of one color component can be derived from the MV(s) of one or more sub-blocks of another color component, which has (have) already been derived with the affine model. In this case, there is no need to derive motion information of one color component based on the information of the same color component three times.

Figure 16:
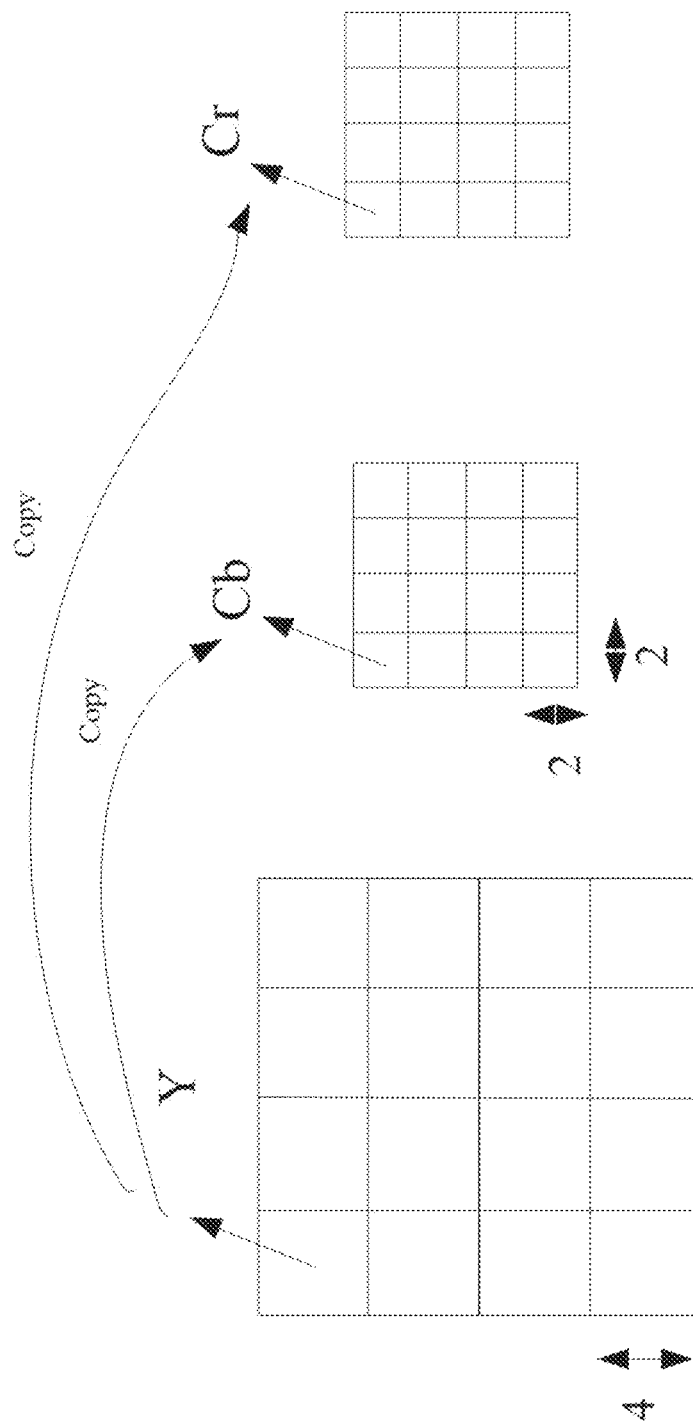
FIG. 16 shows an example of sub-block motion vector (MV) copying in accordance with the disclosed technology.

(a) In one example, the MV of a sub-block for one component can be derived from the MV of one corresponding sub-block for another component. FIG. 16 shows an example for the 4:2:0 format. The blocks for each component are divided following the example in FIG. 13. A first derived MV* is copied from the MV of a corresponding 4×4 sub-block in the Y component, then the MV of the 2×2 sub-block in the Cb or Cr component is derived from MV*, following the rule specified in Section 1.6.

Figure 17:
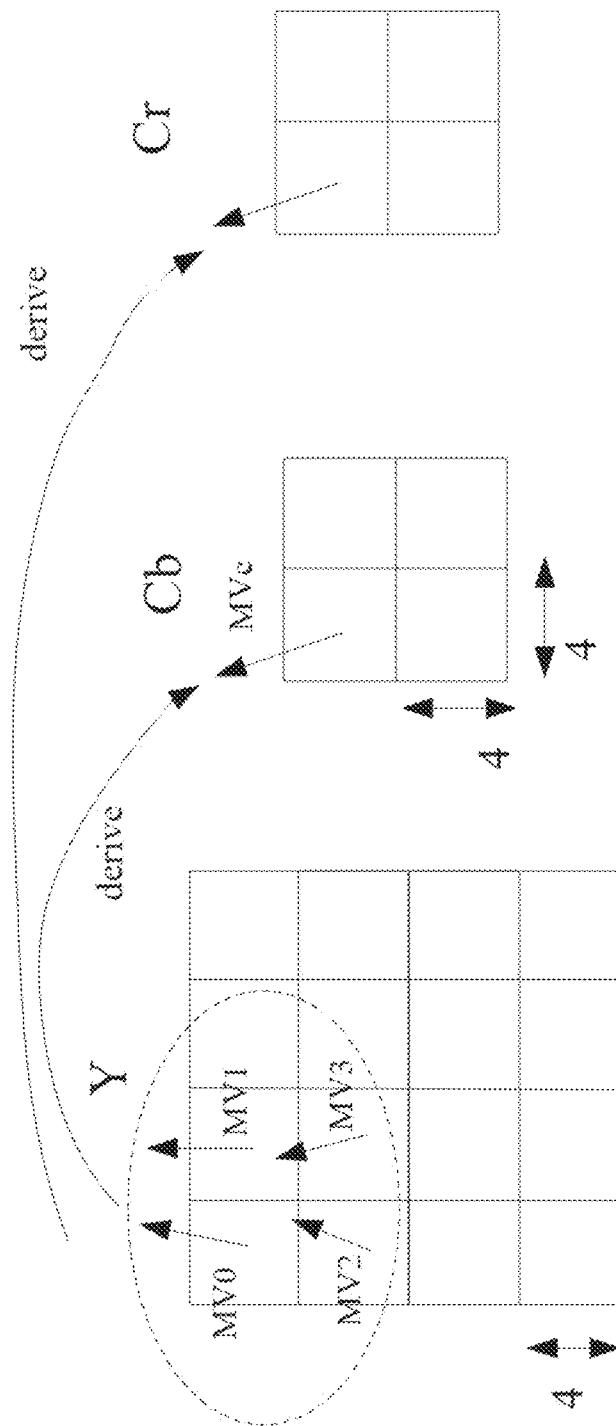
FIG. 17 shows another example of sub-block MV copying in accordance with the disclosed technology.

(b) In another example, the MV of a sub-block for one component can be derived from the MVs of several corresponding sub-blocks for another component. FIG. 17 shows an example for the 4:2:0 format, where the 4×4 sub-block in the Cb or Cr component corresponds to four 4×4 sub-block in the Y component. The blocks for each component are divided following the example in FIG. 14. A first derived MV* is calculated from the MVs of several corresponding sub-blocks for another component, then the MV of the 4×4 sub-block in the Cb or Cr component is derived from MV*, following the rule specified in Section 1.6.
  (i) In one embodiment, MV* is calculated as the average of all corresponding sub-block MVs in the Y component. In an example, MV*=(MV0+MV1+MV2+MV3)/4. Suppose MV*=(MV*x, MV*y), MV0=(MV0x, MV0y), MV1=(MV1x, MV1y), MV2=(MV2x, MV2y) and MV3=(MV3x, MV3y),
    (1) In one embodiment, MV*x=Shift(MV0x+MV1x+MV2x+MV3x, 2), MV*y=Shift(MV0y+MV1y+MV2y+MV3y, 2).
    (2) In another embodiment, MVx*=SignShift(MV0x+MV1x+MV2x+MV3x, 2), MVy*=SignShift(MV0y+MV1y+MV2y+MV3y, 2).
    (3) In another embodiment, the calculation of MV* may be done with the following steps in order:

MV'x=Shift(MV0x+MV1x,1),

MV'y=Shift(MV0y+MV1y,1),

MV"x=Shift(MV2x+MV3x,1),

MV"y=Shift(MV2y+MV3y,1),

MV*x=Shift(MV'x+MV"x,1), and

MV*y=Shift(MV'y+MV"y,1).

(4) In another embodiment, the calculation of MV* may be done with the following steps in order:

MV'x=Shift(MV0x+MV2x,1),

MV'y=Shift(MV0y+MV2y,1),

MV"x=Shift(MV1x+MV3x,1),

MV"y=Shift(MV1y+MV3y,1),

MV*x=Shift(MV'x+MV"x,1), and

MV*y=Shift(MV'y+MV"y,1).

(5) In another embodiment, the calculation of MV* may be done with the following steps in order:

$$MV'x = SignShift(MV0x + MV1x, 1),$$

$$MV'y = SignShift(MV0y + MV1y, 1),$$

$$MV''x = SignShift(MV2x + MV3x, 1),$$

$$MV''y = SignShift(MV2y + MV3y, 1),$$

$$MV*x = SignShift(MV'x + MV''x, 1), \text{ and}$$

$$MV*y = SignShift(MV'y + MV''y, 1).$$

(6) In another embodiment, the calculation of MV* may be done with the following steps in order:

$$MV'x = SignShift(MV0x + MV2x, 1),$$

$$MV'y = SignShift(MV0y + MV2y, 1),$$

$$MV''x = SignShift(MV1x + MV3x, 1),$$

$$MV''y = SignShift(MV1y + MV3y, 1),$$

$$MV*x = SignShift(MV'x + MV''x, 1), \text{ and}$$

$$MV*y = SignShift(MV'y + MV''y, 1).$$

Figure 18:
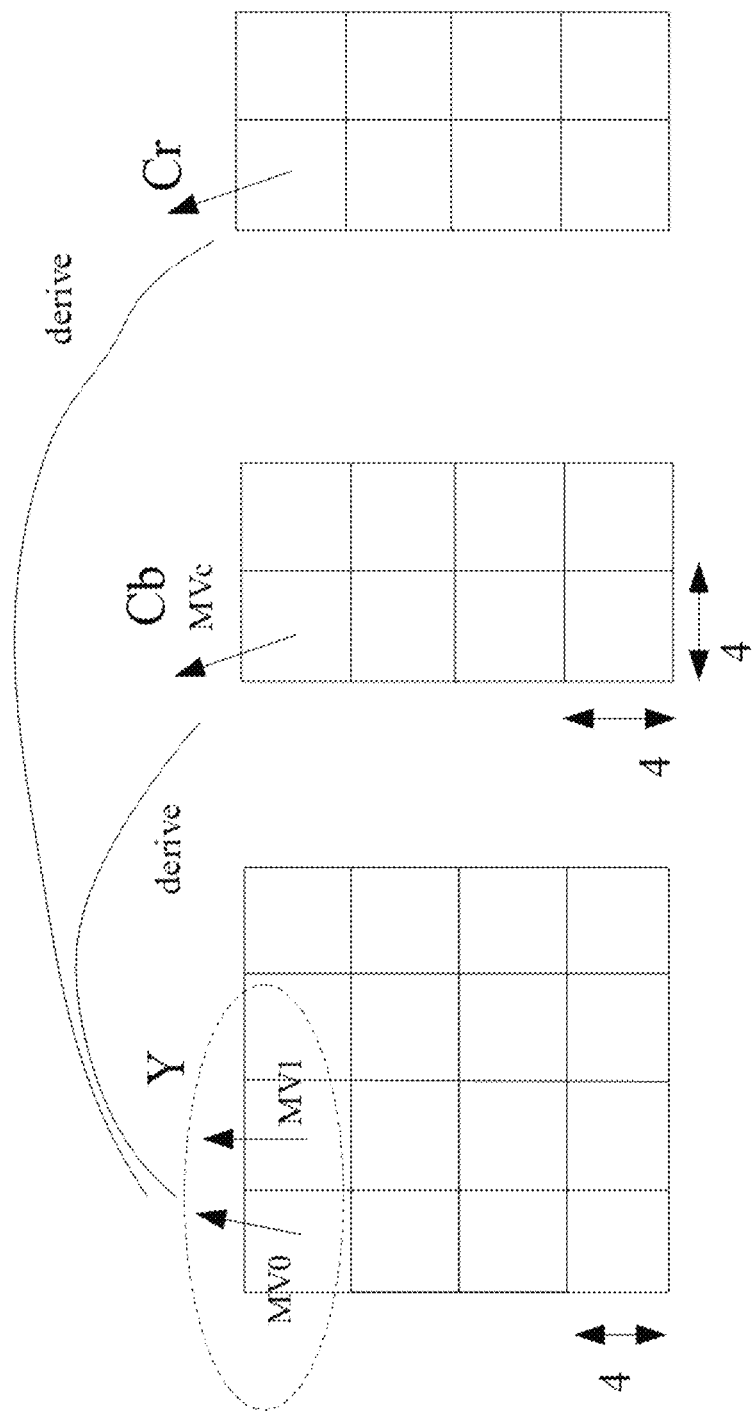
FIG. 18 shows an example of sub-block MV derivation.

(ii) In one embodiment, MV* is calculated as the MV of top-left corresponding sub-block in the Y component. In the example, MV*=MV0.
(iii) In one embodiment, MV* is calculated as the MV of center corresponding sub-block in the Y component.
(iv) In one embodiment, MV* is calculated as the median of all corresponding sub-block MVs in the Y component. In an example, MV*=median(MV0,MV1,MV2, MV3).
(v) How to derive MVs of sub-blocks for one component from another component may be determined based on the color formats, such as 4:2:0, 4:2:2 and 4:4:4.
  (1) In an example when the color format is 4:4:4, the sub-block sizes are the same for all components, and the MV of a sub-block for each sub-block is the same.
  (2) In an example when the color format is 4:2:2. the sub-block sizes are the same for all components. A first derived MV* is calculated from the MVs of several corresponding sub-blocks for another component, then the MV of the sub-block in the Cb or Cr component is derived from MV*, following the rule specified in section 2.6. In the example shown in FIG. 18, one Cb/Cr sub-block corresponds to two Y sub-block with motion vectors MV0 and MV1.
    (a) MV*=(MV0+MV1)/2; Suppose MV*=(MV*x, MV*y), MV0=(MV0x, MV0y), MV1=(MV1x, MV1y),
      (i) In one embodiment, MV*x=Shift(MV0x+MV1x, 1), MV*y=Shift(MV0y+MV1y, 1).
      (ii) In another embodiment, MVx*=SignShift(MV0x+ MV1x, 1), MVy*=SignShift(MV0y+MV1y, 1).

Examples of Unified Constraints for Merge and Non-Merge Affine Modes

Example 3. The merge affine mode and the non-merge affine mode are allowed or disallowed with the same block size constraint.
(a) The block size constrain depends on the width and height compared to one or two thresholds. For example, both the Merge affine mode and the non-merge affine mode are allowed if the width and the height of the current block are both larger than M (e.g., M equal to 8), or width is larger than M0 and height is larger than M1 (e.g., M0 equal to 8 and M1 equal to 4); Otherwise, both the Merge affine mode and the non-merge affine mode are not allowed.
(b) The block size constrain depends on the total number of samples within one block (i.e., the area width× height). In one example, both the Merge affine mode and the non-merge affine mode are allowed if the area (i.e. width×height) of the current block is not smaller than N (e.g., N equal to 64); Otherwise, both the Merge affine mode and the non-merge affine mode are not allowed.
(c) For the merge affine mode, it can be an explicit mode with signaling a flag as in JEM, or it can be an implicit mode without signaling a flag as in other implementations. In the latter case, the affine merge candidate is not put into the unified merge candidate list if the merge affine mode is not allowed.
(d) For the non-merge affine mode, when affine is disallowed according to above rules, the signaling of indications of affine mode is skipped.

Examples of the Unified Rounding Process

Example 4. Suppose one merge candidate has a motion vector denoted by MV0=(MV0x, MV0y) and another merge candidate has a motion vector denoted by MV1=(MV1x, MV1y), then one MV of the pairwise merge candidate derived from these two merge candidates, denoted as MV*= (MV*x, MV*y), is derived as $$MV*x = Shift(MV0x + MV1x, 1), \text{ and}$$

$$MV*y = Shift(MV0y + MV1y, 1).$$

Alternatively, $$MV*x = SignShift(MV0x + MV1x, 1), \text{ and}$$

$$MV*y = SignShift(MV0y + MV1y, 1).$$

Example 5. Suppose one merge candidate has a motion vector denoted by MV0=(MV0x, MV0y) and another merge candidate has a motion vector denoted by MV1=(MV1x, MV1y), and MV0 and/or MV1 refer to the current picture, then one MV of the pairwise merge candidate derived from these two merge candidates, denoted as MV*=(MV*x, MV*y), is derived as
  (a) MV*x=Shift(MV0x+MV1x, 1); MV*y=Shift(MV0y+ MV1y, 1); then MV*x=(Shift(MV*x, 4))<<4; MV*y= (Shift(MV*y, 4))<<4
  (b) MV*x=SignShift(MV0x+MV1x, 1); MV*y=SignShift (MV0y+MV1y, 1); then MV*x= (SignShift (MV*x, 4))<<4; MV*y=(SignShift (MV*y, 4))<<4
  (c) MV*x=(Shift(MV0x+MV1x, (W+1)))<<W; MV*y= (Shift(MV0y+MV1y, (W+1)))<<W, where W is an integer such as 2 or 4. W is an integer so that 1<<W is equal to the MV representation precision.
  (d) MV*x=(SignShift(MV0x+MV1x, (W+1)))<<W; MV*y=(SignShift(MV0y+MV1y, (W+1)))<<W, where W is an integer such as 2 or 4. W is an integer so that 1<<W is equal to the MV representation precision.

Example 6. Assume the scaled MV denoted by (MV1'x, MV1'y) and the List 0 MV by (MV0x, MV0y). The averaged uni-prediction from List 0 motion candidate denoted by (MV*x, MV*y) is defined as:

$$MV*x = Shift(MV0x + MV1'x, 1), \text{ and}$$

$$MV*y = Shift(MV0y + MV1'y, 1).$$

Alternatively, $$MV^*x = \text{SignShift}(MV0x + MV1'x, 1), \text{ and}$$

$$MV^*y = \text{SignShift}(MV0y + MV1'y, 1).$$

In some embodiments, SignShift(x, s) can right shift an integer toward 0, defined as:

$$\text{SignShift}(x, s) = \begin{cases} (x + \text{off}) \gg s & x \geq 0 \\ -((-x + \text{off}) \gg s) & x < 0 \end{cases}.$$

Herein, off=(1<<(s−1))−1.

In other embodiments, SignShift(x, s) can be alternatively defined as:

$$\text{SignShift}(x, s) = \begin{cases} (x + \text{off}) \gg s & x \geq 0 \\ (x + \text{off} + 1) \gg s & x < 0 \end{cases}.$$

Herein, off=(1<<(s−1))−1.

The examples described above may be incorporated in the context of the methods described below, e.g., methods 1930, 1960 and 1990 which may be implemented at a video decoder and/or video encoder.

Figure 19A:
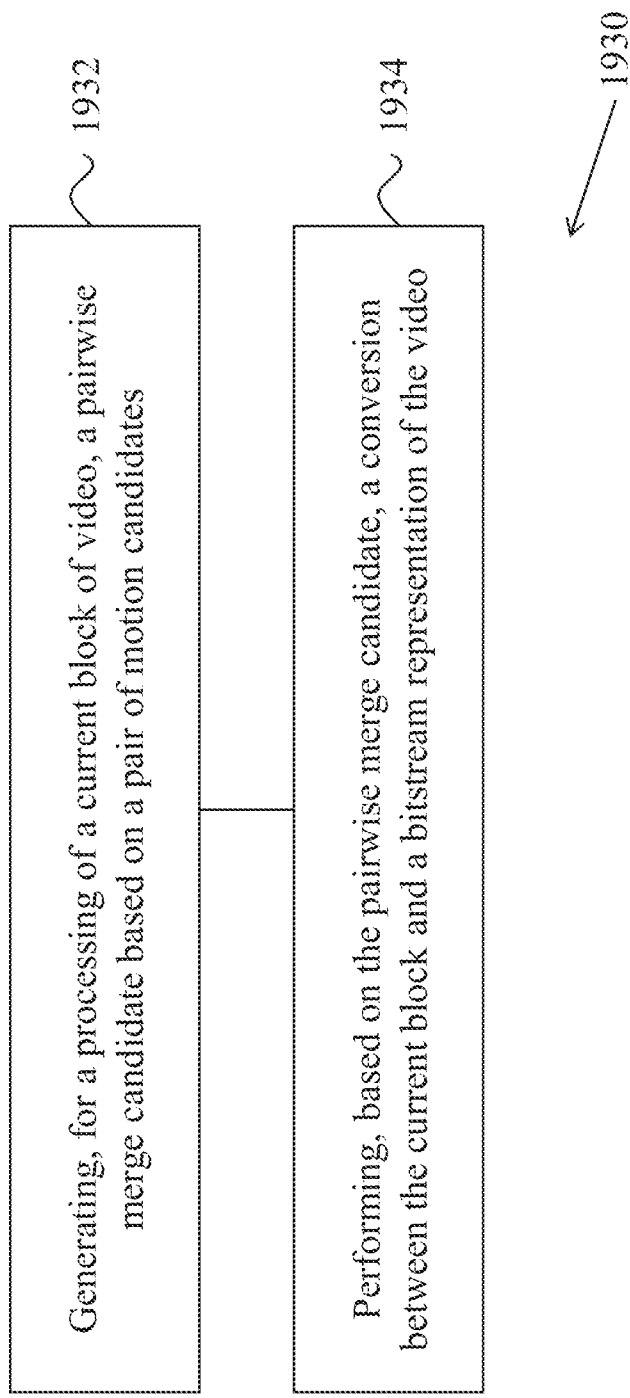
FIGS. 19A-19C show flowcharts of example methods of video processing.

FIG. 19A shows a flowchart of an exemplary method 1930 of video processing. The method 1930 includes, at step 1932, generating, for a processing of a current block of video, a pairwise merge candidate based on a pair of motion candidates.

The method 1930 includes, at step 1934, performing, based on the pairwise merge candidate, a conversion between the current block and a bitstream representation of the video.

Figure 19B:
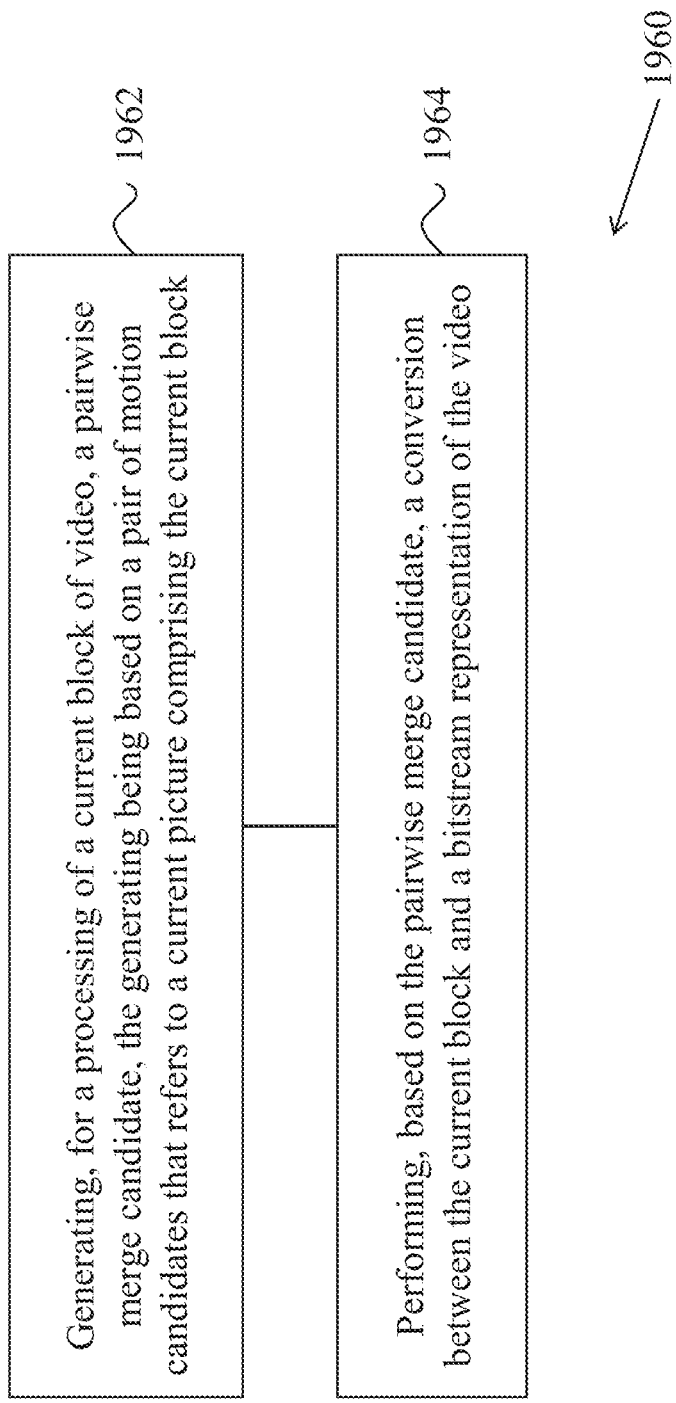

FIG. 19B shows a flowchart of an exemplary method 1960 of video processing. The method 1960 includes, at step 1962, generating, for a processing of a current block of video, a pairwise merge candidate, the generating being based on a pair of motion candidates that refers to a current picture comprising the current block.

The method 1960 includes, at step 1964, performing, based on the pairwise merge candidate, a conversion between the current block and a bitstream representation of the video.

Figure 19C:
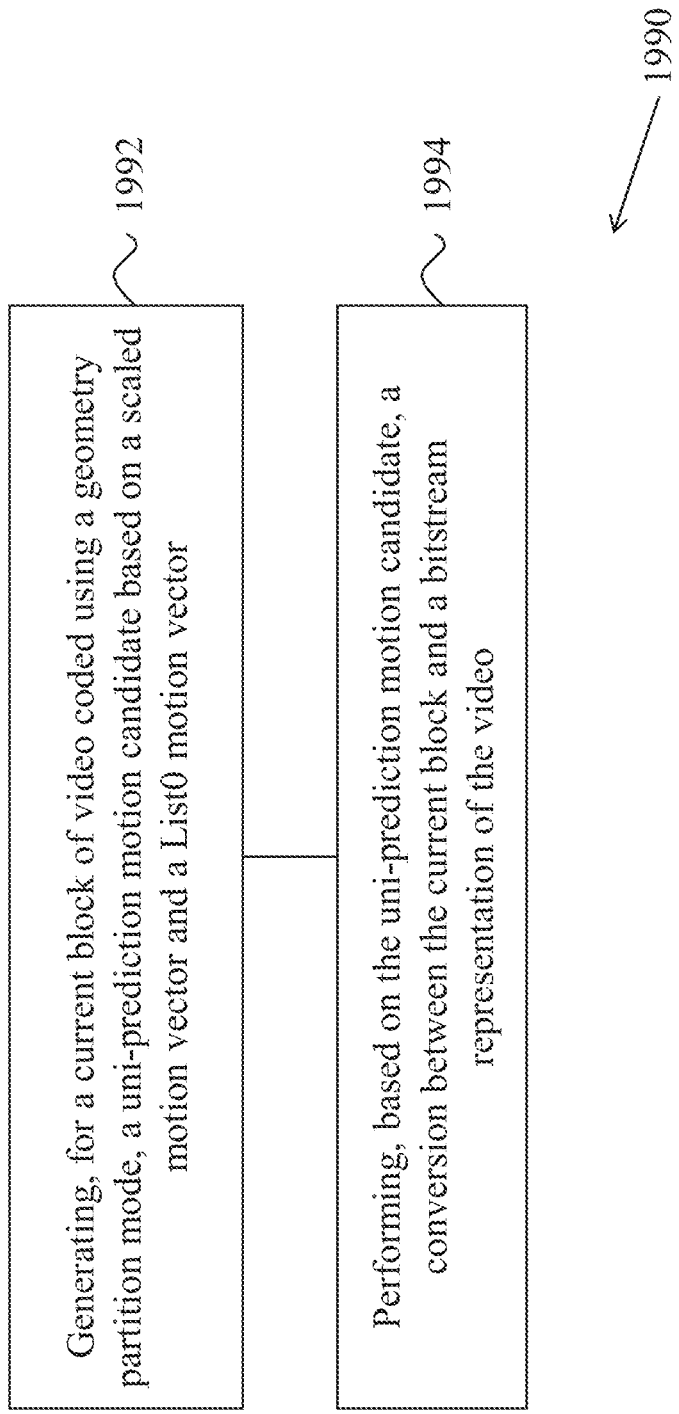

FIG. 19C shows a flowchart of an exemplary method 1990 of video processing. The method 1990 includes, at step 1992, generating, for a current block of video coded using a geometry partition mode, a uni-prediction motion candidate based on a scaled motion vector and a List0 motion vector.

The method 1990 includes, at step 1994, performing, based on the uni-prediction motion candidate, a conversion between the current block and a bitstream representation of the video.

In some embodiments, the following technical solutions are implemented:

A1. A method of video processing, comprising: generating, for a processing of a current block of video, a pairwise merge candidate based on a pair of motion candidates; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = \text{Shift}(MV0x + MV1x, 1) \text{ and } MV^*y = \text{Shift}(MV0y + MV1y, 1),$$

wherein Shift(x, s)=(x+off)>>s, wherein off and s are integers, and wherein >> represents a right shift operation.

A2. A method of video processing, comprising: generating, for a processing of a current block of video, a pairwise merge candidate based on a pair of motion candidates; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = \text{SignShift}(MV0x + MV1x, 1) \text{ and}$$

$$MV^*y = \text{SignShift}(MV0y + MV1y, 1),$$

$$\text{wherein SignShift}(x, s) = \begin{cases} (x + \text{off}) \gg s & x \geq 0 \\ -((-x + \text{off}) \gg s) & x < 0 \end{cases},$$

wherein off and s are integers, and wherein >> represents a shift operation.

A3. A method of video processing, comprising: generating, for a processing of a current block of video, a pairwise merge candidate based on a pair of motion candidates; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=MV*x, MV*y) is the pairwise merge candidate such that:

$$MV^*x = \text{SignShift}(MV0x + MV1x, 1) \text{ and}$$

$$MV^*y = \text{SignShift}(MV0y + MV1y, 1),$$

$$\text{wherein SignShift}(x, s) = \begin{cases} (x + \text{off}) \gg s & x \geq 0 \\ (x + \text{off} + 1) \gg s & x < 0 \end{cases},$$

wherein off and s are integers, and wherein >> represents a shift operation.

A4. The method of any of solutions A1 to A3, wherein the pair of merge candidates is from a merge candidate list.

A5. The method of any of solutions A1 to A3, wherein the reference picture list L comprises reference picture list 0 (L0) or reference picture list 1 (L1).

A6. The method of any of solutions A1 to A3, further comprising: inserting the pairwise merge candidate into the merge candidate list.

A7. The method of any of solutions A1 to A3, further comprising: updating, subsequent to performing the conversion, the merge candidate list.

A8. The method of any of solutions A1 to A7, wherein off=0.

A9. The method of any of solutions A1 to A7, wherein off=0 upon a determination that s=0.

A10. The method of any of solutions A1 to A7, wherein off=1<<(s−1).

A11. The method of any of solutions A1 to A7, wherein off=1>>(s−1) upon a determination that s≠0.

A12. The method of any of solutions A1 to A7, wherein off=(1>>(s−1))−1.

A13. The method of any of solutions A1 to A12, wherein the current video block is a coding unit.

A14. The method of any of solutions A1 to A13, wherein performing the conversion comprises generating the bitstream representation from the current video block.

A15. The method of any of solutions A1 to A13, wherein performing the conversion comprises generating the current video block from the bitstream representation.

A16. A video decoding apparatus comprising a processor configured to implement a method recited in any one of solutions A1 to A15.

A17. A computer program product stored on a non-transitory computer readable media, the computer program product including program code for carrying out the method in any one of solutions A1 to A15.

In some embodiments, the following technical solutions are implemented:

B1. A method of video processing, comprising: generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

MV*x=Shift(MV0x+MV1x,1) and MV*y=Shift(MV0y+MV1y,1), wherein Shift(x, s)=(x+off)>>s, wherein off and s are integers, and wherein >> represents a right shift operation.

B2. The method of solution B1, wherein generating the pairwise merge candidate further comprises performing the operations:

MV*x=(Shift(MV*x,4))<<4 and MV*y=(Shift(MV*y,4))<<4.

B3. A method of video processing, comprising: generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = SignShift(MV0x + MV1x, 1) \text{ and}$$

$$MV^*y = SignShift(MV0y + MV1y, 1),$$

$$\text{wherein } SignShift(x, s) = \begin{cases} (x + \text{off}) \gg s & x \geq 0 \\ -((-x + \text{off}) \gg s) & x < 0 \end{cases},$$

wherein off and s are integers, and wherein >> represents a shift operation.

B4. The method of solution B3, wherein generating the pairwise merge candidate further comprises performing the operations:

MV*x=(SignShift(MV*x,4))<<4 and MV*y=(SignShift(MV*y,4))<<4.

B5. A method of video processing, comprising: generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = SignShift(MV0x + MV1x, 1) \text{ and}$$

$$MV^*y = SignShift(MV0y + MV1y, 1),$$

$$\text{wherein } SignShift(x, s) = \begin{cases} (x + \text{off}) \gg s & x \geq 0 \\ (x + \text{off} + 1) \gg s & x < 0 \end{cases},$$

wherein off and s are integers, and wherein >> represents a shift operation. B6. The method of solution B5, wherein generating the pairwise merge candidate further comprises performing the operations:

MV*x=(SignShift(MV*x,4))<<4 and MV*y=(SignShift(MV*y,4))<<4.

B7. A method of video processing, comprising: generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

MV*x=(Shift(MV0x+MV1x,(W+1)))<<W and

MV*y=(Shift(MV0y+MV1y,(W+1)))<<W, wherein Shift(x, s)=(x+off)>>s, wherein W, off and s are integers, and wherein >> represents a right shift operation.

B8. A method of video processing, comprising: generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = (SignShift(MV0x+MV1x, (W+1))) << W \text{ and}$$

$$MV^*y = (SignShift(MV0y + MV1y, (W + 1))) \ll W,$$

$$\text{wherein } SignShift(x, s) = \begin{cases} (x + \text{off}) \gg s & x \geq 0 \\ -((-x + \text{off}) \gg s) & x < 0 \end{cases},$$

wherein W, off and s are integers, and wherein >> represents a shift operation.

B9. A method of video processing, comprising: generating, for a processing of a current block of video, a pairwise merge candidate, wherein the generating is based on a pair of motion candidates that refers to a current picture comprising the current block; and performing, based on the pairwise merge candidate, a conversion between the current block and a bitstream representation of the video, wherein the pair of motion candidates comprises a first motion vector MV0=(MV0x, MV0y) of a reference picture list L in a first motion candidate and a second motion vector MV1=(MV1x, MV1y) of the reference picture list L in a second motion candidate, and wherein MV*=(MV*x, MV*y) is the pairwise merge candidate such that:

$$MV^*x = (SignShift(MV0x+MV1x, (W+1))) << W \text{ and}$$

$$MV^*y = (SignShift(MV0y + MV1y, (W + 1))) \ll W,$$

$$\text{wherein } SignShift(x, s) = \begin{cases} (x + \text{off}) \gg s & x \geq 0 \\ (x + \text{off} + 1) \gg s & x < 0 \end{cases},$$

wherein W, off and s are integers, and wherein >> represents a shift operation.

B10. The method of any of solutions B7 to B9, wherein W=2 or W=4.

B11. The method of solution B10, wherein (1<<W) is a motion vector representation precision.

B12. The method of any of solutions B1 to B11, wherein the pair of merge candidates is from a merge candidate list.

B13. The method of any of solutions B1 to B11, wherein the reference picture list L comprises reference picture list 0 (L0) or reference picture list 1 (L1).

B14. The method of any of solutions B1 to B11, further comprising: inserting the pairwise merge candidate into the merge candidate list.

B15. The method of any of solutions B1 to B11, further comprising: updating, subsequent to performing the conversion, the merge candidate list.

B16. The method of any of solutions B1 to B15, wherein off=0.

B17. The method of any of solutions B1 to B15, wherein off=0 upon a determination that s=0.

B18. The method of any of solutions B1 to B15, wherein off=1<<(s−1).

B19. The method of any of solutions B1 to B15, wherein off=1<<(s−1) upon a determination that s≠0.

B20. The method of any of solutions B1 to B15, wherein off=(1<<(s−1))−1.

B21. The method of any of solutions B1 to B20, wherein the current video block is a coding unit.

B22. The method of any of solutions B1 to B21, wherein performing the conversion comprises generating the bitstream representation from the current block.

B23. The method of any of solutions B1 to B21, wherein performing the conversion comprises generating the current block from the bitstream representation.

B24. A video decoding apparatus comprising a processor configured to implement a method recited in any one of solutions B1 to B23.

B25. A computer program product stored on a non-transitory computer readable media, the computer program product including program code for carrying out the method in any one of solutions B1 to B23.

In some embodiments, the following technical solutions are implemented:

C1. A method of video processing, comprising: generating, for a current block of video coded using a geometry partition mode, a uni-prediction motion candidate based on a scaled motion vector and a List0 motion vector; and performing, based on the uni-prediction motion candidate, a conversion between the current block and a bitstream representation of the video, wherein the scaled motion vector is MV1'=(MV1'x, MV1'y) and the List0 motion vector is MV0=(MV0x, MV0y), and wherein MV*=(MV*x, MV*y) is the uni-prediction motion candidate such that:

MV*x=Shift(MV0x+MV1'x,1) and MV*y=Shift(MV0y+MV1'y,1), wherein Shift(x, s)=(x+off)>>s, wherein off and s are integers, and wherein >> represents a right shift operation.

C2. A method of video processing, comprising: generating, for a current block of video coded using a geometry partition mode, a uni-prediction motion candidate based on a scaled motion vector and a List0 motion vector; and performing, based on the uni-prediction motion candidate, a conversion between the current block and a bitstream representation of the video, wherein the scaled motion vector is MV1'=(MV1'x, MV1'y) and the List0 motion vector is MV0=(MV0x, MV0y), and wherein MV*=(MV*x, MV*y) is the uni-prediction motion candidate such that:

$$MV^*x = SignShift(MV0x + MV1'x, 1) \text{ and}$$

$$MV^*y = SignShift(MV0y + MV1'y, 1),$$

$$\text{wherein } SignShift(x, s) = \begin{cases} (x + \text{off}) \gg s & x \geq 0 \\ -((-x + \text{off}) \gg s) & x < 0 \end{cases},$$

wherein off and s are integers, and wherein >> represents a shift operation.

C3. A method of video processing, comprising: generating, for a current block of video coded using a geometry partition mode, a uni-prediction motion candidate based on a scaled motion vector and a List0 motion vector; and performing, based on the uni-prediction motion candidate, a conversion between the current block and a bitstream representation of the video, wherein the scaled motion vector is MV1'=(MV1'x, MV1'y) and the List0 motion vector is MV0=(MV0x, MV0y), and wherein MV*=(MV*x, MV*y) is the uni-prediction motion candidate such that:

$$MV^*x = SignShift(MV0x + MV1'x, 1) \text{ and}$$

$$MV^*y = SignShift(MV0y + MV1'y, 1),$$

$$\text{wherein } SignShift(x, s) = \begin{cases} (x + \text{off}) \gg s & x \geq 0 \\ (x + \text{off} + 1) \gg s & x < 0 \end{cases},$$

wherein off and s are integers, and wherein >> represents a shift operation.

C4. The method of any of claims 1 to 3, wherein MV* uses a reference picture from List0.

C5. The method of any of solutions C1 to C3, wherein the scaled motion vector and the List0 motion vector are from a motion candidate list derived from blocks coded using the geometry partition mode.

C6. The method of any of solutions C1 to C3, further comprising: inserting the uni-prediction motion candidate into the motion candidate list.

C7. The method of any of solutions C1 to C3, further comprising: updating, subsequent to performing the conversion, the motion candidate list.

C8. The method of any of solutions C1 to C7, wherein off=0.

C9. The method of any of solutions C1 to C7, wherein off=0 upon a determination that s=0.

C10. The method of any of solutions C1 to C7, wherein off=1>>(s−1).

C11. The method of any of solutions C1 to C7, wherein off=1>>(s−1) upon a determination that s≠0.

C12. The method of any of solutions C1 to C7, wherein off=(1<<(s−1))−1.

C13. The method of any of solutions C1 to C12, wherein the geometry partition mode comprises a triangular prediction mode (TPM).

C14. The method of any of solutions C1 to C12, wherein the current block is partitioned into multiple partitions with at least one partition being non-square and non-rectangular.

C15. The method of any of solutions C1 to C14, wherein the current video block is a coding unit.

C16. The method of any of solutions C1 to C15, wherein performing the conversion comprises generating the bitstream representation from the current video block.

C17. The method of any of solutions C1 to C15, wherein performing the conversion comprises generating the current video block from the bitstream representation.

C18. A video decoding apparatus comprising a processor configured to implement a method recited in any one of solutions C1 to C17.

C19. A computer program product stored on a non-transitory computer readable media, the computer program product including program code for carrying out the method in any one of solutions C1 to C17.

4 Example Implementations of the Disclosed Technology

Figure 20:
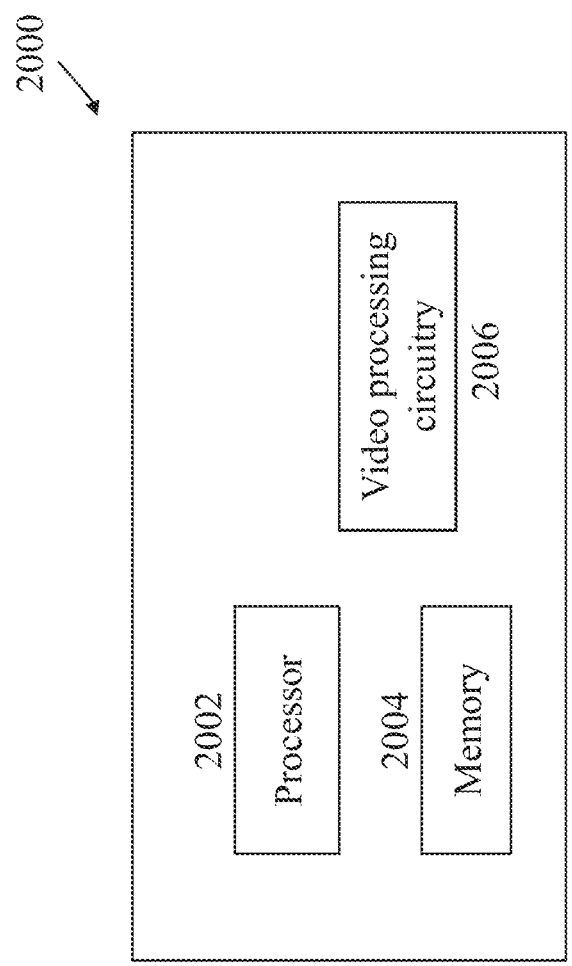
FIG. 20 is a block diagram of an example of a hardware platform for implementing a visual media decoding or a visual media encoding technique described in the present disclosure.

FIG. 20 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods (including, but not limited to, methods 1930, 1960 and 1990) described in the present disclosure. The memory (memories) 2004 may be used for storing data and code used for implementing the methods and techniques described herein. The video processing hardware 2006 may be used to implement, in hardware circuitry, some techniques described in the present disclosure.

In some embodiments, the video decoding methods may be implemented using an apparatus that is implemented on a hardware platform as described with respect to FIG. 20.

Figure 21:
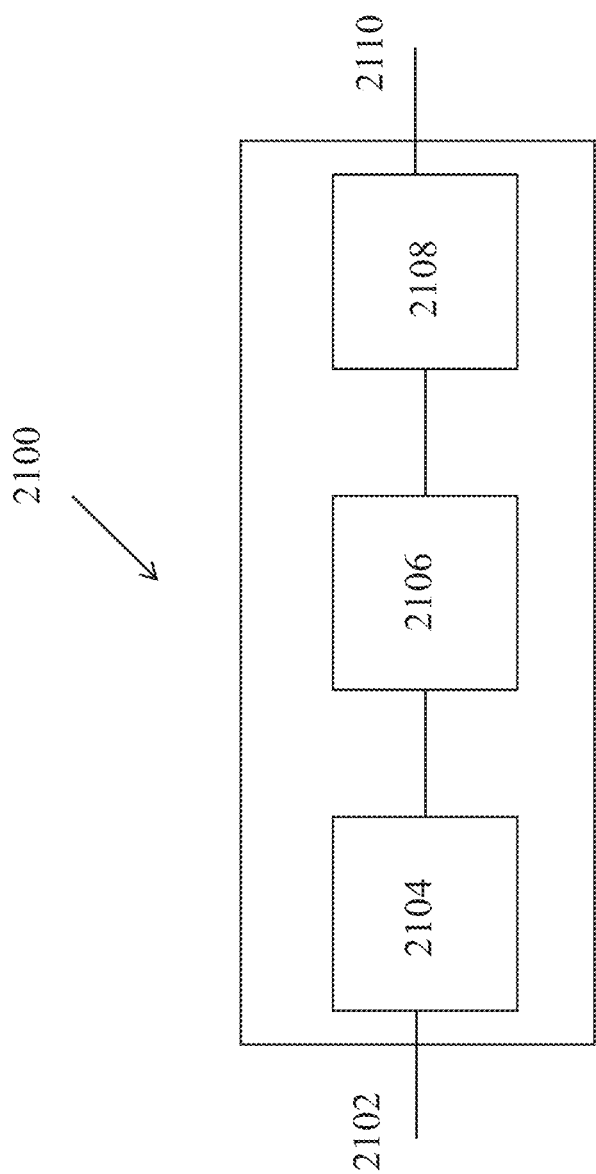
FIG. 21 is a block diagram of an example video processing system in which disclosed techniques may be implemented.

FIG. 21 is a block diagram showing an example video processing system 2100 in which various techniques disclosed herein may be implemented. Various implementations may include some or all of the components of the system 2100. The system 2100 may include input 2102 for receiving video content. The video content may be received in a raw or uncompressed format, e.g., 8 or 10 bit multi-component pixel values, or may be in a compressed or encoded format. The input 2102 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 2100 may include a coding component 2104 that may implement the various coding or encoding methods described in the present disclosure. The coding component 2104 may reduce the average bitrate of video from the input 2102 to the output of the coding component 2104 to produce a coded representation of the video. The coding techniques are therefore sometimes called video compression or video transcoding techniques. The output of the coding component 2104 may be either stored, or transmitted via a communication connected, as represented by the component 2106. The stored or communicated bitstream (or coded) representation of the video received at the input 2102 may be used by the component 2108 for generating pixel values or displayable video that is sent to a display interface 2110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While the present disclosure contains many specifics, these should not be construed as limitations on the scope of any embodiment or of what may be claimed, but rather as descriptions of features that may be specific to particular embodiments of particular disclosures. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described, and other implementations, enhancements and variations can be made based on what is described and illustrated in the present disclosure.

What is claimed is:

1. A method of coding video data, comprising:
constructing, for a first block of a video, a merge motion candidate list which comprises at least two merge motion candidates;
deriving, based on a position index to the merge motion candidate list and a first unified rounding process, a pairwise average merging candidate from a pair of merge motion candidates included in the merge motion candidate list;
performing, based on the pairwise average merging candidate, a first conversion between the first block and a bitstream of the video;
determining, for a second conversion between a second block of the video and the bitstream of the video, that whether or not a first affine mode is allowed for the second block and whether or not a second affine mode is allowed for the second block are based on a same dimension constrain; and
performing, based on the determining, the second conversion between the second block and the bitstream, wherein the first rounding process is defined as:

$$SignShift(m, s) = \begin{cases} (m + \text{off}) \gg s & m \geq 0 \\ -((-m + \text{off}) \gg s) & m < 0 \end{cases},$$

wherein off and s are integers, and wherein >> represents a right shift operation.

2. The method of claim 1, wherein the pair of merge motion candidates comprises a first motion vector MV0=(MV0x, MV0y) of a reference picture list L in a first merge motion candidate and a second motion vector MV1=(MV1x, MV1y) of the reference picture list L in a second merge motion candidate, and wherein MV*=(MV*x, MV*y) is the pairwise merge candidate such that:

MV*x=SignShift(MV0x+MV1x,s) and
MV*y=SignShift(MV0y+MV1y,s).

3. The method of claim 2, wherein position indices of the pair of merge motion candidates are fixed with 0 and 1.

4. The method of claim 2, wherein the reference picture list L comprises reference picture list 0 (L0) or reference picture list 1 (L1).

5. The method of claim 2, further comprising inserting the pairwise average merging candidate into the merge motion candidate list.

6. The method of claim 2, wherein off=0.

7. The method of claim 2, wherein s=1.

8. The method of claim 1, wherein off=0 upon a determination that s=0.

9. The method of claim 1, wherein off=(1<<(s−1))−1.

10. The method of claim 1, wherein s=4.

11. The method of claim 1, wherein the first conversion comprises encoding the first block into the bitstream.

12. The method of claim 1, wherein the first conversion comprises decoding the first block from the bitstream.

13. An apparatus for processing video data comprising a processor and a non-transitory memory with instructions thereon, wherein the instructions upon execution by the processor, cause the processor to:
construct, for a first block of a video, a merge motion candidate list which comprises at least two merge motion candidates;
derive, based on a position index to the merge motion candidate list and a first unified rounding process, a pairwise average merging candidate from a pair of merge motion candidates included in the merge motion candidate list;
perform, based on the pairwise average merging candidate, a first conversion between the first block and a bitstream of the video;
determine, for a second conversion between a second block of the video and the bitstream of the video, that whether or not a first affine mode is allowed for the second block and whether or not a second affine mode is allowed for the second block are based on a same dimension constrain; and
perform, based on the determination, the second conversion between the second block and the bitstream,
wherein the first rounding process is defined as:

$$SignShift(m, s) = \begin{cases} (m + \text{off}) \gg s & m \geq 0 \\ -((-m + \text{off}) \gg s) & m < 0 \end{cases},$$

wherein off and s are integers, and wherein >> represents a right shift operation.

14. The apparatus of claim 13, wherein the pair of merge motion candidates comprises a first motion vector MV0=(MV0x, MV0y) of a reference picture list L in a first merge motion candidate and a second motion vector MV1=(MV1x, MV1y) of the reference picture list L in a second merge motion candidate, and wherein MV*=(MV*x, MV*y) is the pairwise merge candidate such that:

MV*x=SignShift(MV0x+MV1x,s) and
MV*y=SignShift(MV0y+MV1y,s).

15. The apparatus of claim 14, wherein position indices of the pair of merge motion candidates are fixed with 0 and 1,
wherein the reference picture list L comprises reference picture list 0 (L0) or reference picture list 1 (L1),
wherein the instructions further cause the processor to insert the pairwise average merging candidate into the merge motion candidate list,
wherein off=0, and
wherein s=1.

16. The apparatus of claim 13, wherein off=0 upon a determination that s=0, or off=(1<<(s−1))−1, and wherein s=4.

17. A non-transitory computer-readable storage medium storing instructions that cause a processor to:
construct, for a first block of a video, a merge motion candidate list which comprises at least two merge motion candidates;
derive, based on a position index to the merge motion candidate list and a first unified rounding process, a pairwise average merging candidate from a pair of merge motion candidates included in the merge motion candidate list;
perform, based on the pairwise average merging candidate, a first conversion between the first block and a bitstream of the video;
determine, for a second conversion between a second block of the video and the bitstream of the video, that whether or not a first affine mode is allowed for the second block and whether or not a second affine mode is allowed for the second block are based on a same dimension constrain; and perform, based on the determining, the second conversion between the second block and the bitstream,
wherein the first rounding process is defined as:

$$SignShift(m, s) = \begin{cases} (m + \text{off}) \gg s & m \geq 0 \\ -((-m + \text{off}) \gg s) & m < 0 \end{cases},$$

wherein off and s are integers, and wherein >> represents a right shift operation.

18. The non-transitory computer-readable storage medium of claim 17, wherein the pair of merge motion candidates comprises a first motion vector MV0=(MV0x, MV0y) of a reference picture list L in a first merge motion candidate and a second motion vector MV1=(MV1x, MV1y) of the reference picture list L in a second merge motion candidate, and wherein MV*=(MV*x, MV*y) is the pairwise merge candidate such that: MV*x=SignShift (MV0x+MV1x, s) and MV*y=SignShift (MV0y+MV1y,s),
wherein the position indices of the pair of merge motion candidates are fixed with 0 and 1,
wherein the reference picture list L comprises reference picture list 0 (L0) or reference picture list 1 (L1),
wherein the instructions further cause the processor to insert the pairwise average merging candidate into the merge motion candidate list,
wherein off=0, or off=0 upon a determination that s=0, or off=(1<<(s−1))−1, and
wherein s=1 or 4.

19. A non-transitory computer-readable recording medium storing a bitstream of a video which is generated by a method performed by a video processing apparatus, wherein the method comprises:
  constructing, for a first block of the video, a merge motion candidate list which comprises at least two merge motion candidates;
  deriving, based on a position index to the merge motion candidate list and a first rounding process, a pairwise average merging candidate from a pair of merge motion candidates included in the merge motion candidate list;
  determining, for a second block of the video, that whether or not a first affine mode is allowed for the second block and whether or not a second affine mode is allowed for the second block are based on a same dimension constrain;
  generating, based on the pairwise average merging candidate and the determining, the bitstream of the video;
  wherein the first rounding process is defined as:

$$SignShift(m, s) = \begin{cases} (m + \text{off}) \gg s & m \geq 0 \\ -((-m + \text{off}) \gg s) & m < 0 \end{cases},$$

wherein off and s are integers, and wherein >> represents a right shift operation.

20. The non-transitory computer-readable recording medium of claim 19, wherein the pair of merge motion candidates comprises a first motion vector $MV0=(MV0x, MV0y)$ of a reference picture list L in a first merge motion candidate and a second motion vector $MV1=(MV1x, MV1y)$ of the reference picture list L in a second merge motion candidate, and wherein $MV^*=(MV^*x, MV^*y)$ is the pairwise merge candidate such that: $MV^*x=SignShift (MV0x+MV1x, s)$ and $MV^*y=SignShift (MV0y+MV1y,s)$,
  wherein the position indices of the pair of merge motion candidates are fixed with 0 and 1,
  wherein the reference picture list L comprises reference picture list 0 (L0) or reference picture list 1 (L1),
  wherein the method further includes inserting the pairwise average merging candidate into the merge motion candidate list,
  wherein off=0, or off=0 upon a determination that s=0, or off=(1<<(s−1))−1, and
  wherein s=1 or 4.

* * * * *